(12) United States Patent
Kakimi et al.

(10) Patent No.: US 10,312,675 B2
(45) Date of Patent: Jun. 4, 2019

(54) ELECTRICAL CONNECTION BOX AND WIRE HARNESS

(71) Applicant: Yazaki Corporation, Tokyo (JP)

(72) Inventors: Takaaki Kakimi, Shizuoka (JP); Tatsuhiko Ikeda, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/953,593

(22) Filed: Apr. 16, 2018

(65) Prior Publication Data

US 2018/0309279 A1 Oct. 25, 2018

(30) Foreign Application Priority Data

Apr. 25, 2017 (JP) ................ 2017-086163

(51) Int. Cl.
| | |
|---|---|
| *H02G 3/08* | (2006.01) |
| *B60R 16/02* | (2006.01) |
| *B60R 16/023* | (2006.01) |
| *H01B 7/00* | (2006.01) |
| *H02G 3/14* | (2006.01) |
| *H02G 3/18* | (2006.01) |

(52) U.S. Cl.
CPC ......... *H02G 3/088* (2013.01); *B60R 16/0207* (2013.01); *B60R 16/0239* (2013.01); *H01B 7/0045* (2013.01); *H02G 3/086* (2013.01); *H02G 3/083* (2013.01); *H02G 3/14* (2013.01); *H02G 3/18* (2013.01)

(58) Field of Classification Search
CPC . B60R 16/0207; B60R 16/0239; B60R 16/02; H02G 3/08; H02G 3/081; H02G 3/086; H02G 3/083; H02G 3/14; H02G 3/18; H02G 3/088; H05K 5/00; H05K 5/02; H05K 7/00; H01B 7/0045
USPC ......... 174/50, 520, 559, 17 R, 60, 535, 560; 439/535, 76.1, 76.2; 220/3.2–3.9, 4.02; 361/600, 601
See application file for complete search history.

(56) References Cited

U.S. PATENT DOCUMENTS

| | | | |
|---|---|---|---|
| 7,253,356 B2 * | 8/2007 | Kiyota | H02G 3/081 174/17 R |
| 7,459,630 B2 * | 12/2008 | Pinol Pedret | H02G 3/088 174/135 |

(Continued)

FOREIGN PATENT DOCUMENTS

JP 2016-007101 A 1/2016

*Primary Examiner* — Angel R Estrada
(74) *Attorney, Agent, or Firm* — Sughrue Mion, PLLC

(57) ABSTRACT

An electrical connection box includes a housing, and at least one electronic component accommodated in the housing. The housing includes an accommodation chamber that accommodates the electronic component, a wire outlet that draws out a wire electrically connected to the electronic component from the housing, and a wire routing space that guides the wire drawn out from the accommodation chamber to the wire outlet. A wall forming an outer wall of the housing includes a drain hole, or a through hole, which communicates the wire routing space and an outer side of the housing and which discharges liquid entering through the wire outlet to the outer side of the housing. The drain hole is formed in a first contact area of an inner wall surface of the wire routing space, toward which the liquid entering the wire routing space through the wire outlet heads first.

12 Claims, 20 Drawing Sheets

(56) References Cited

U.S. PATENT DOCUMENTS

| | | | |
|---|---|---|---|
| 7,671,275 B2 * | 3/2010 | Kubota | H01R 13/5227 174/17 R |
| 8,420,931 B2 * | 4/2013 | Soh | B60R 16/0238 174/50 |
| 9,142,944 B2 * | 9/2015 | Makino | H02G 3/088 |
| 9,438,018 B2 * | 9/2016 | Kaneko | B60R 16/0238 |
| 10,131,297 B1 * | 11/2018 | Kakimi | B60R 16/0238 |

* cited by examiner

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2017-086163 filed in Japan on Apr. 25, 2017.

BACKGROUND OF THE INVENTION

1. Field of the Invention

The present invention relates to an electrical connection box and a wire harness.

2. Description of the Related Art

An electrical connection box provided with a housing and an electronic component accommodated in the housing is conventionally known (Japanese Patent Application Laid-open No. 2016-7101). Such an electrical connection box is installed, for example, in an engine compartment of a vehicle, and is configured to electrically connect at least two to-be-connected objects that are mounted on the vehicle. In this electrical connection box, wires (electricity supply lines, signal wires, and the like) that are electrically connected to an electronic component are drawn out from an inside of a housing to an outside of the housing, and the electronic component is electrically connected to the to-be-connected objects (a power source, a load device, a sensor, and the like) through these wires. The electrical connection box forms a wire harness together with the wires.

Wires drawn out from a housing do not necessarily fill up a wire outlet of the housing, which may form a gap between the wires and the wire outlet. In this case, liquid such as water may enter an electrical connection box through the gap of the wire outlet and may penetrate into the electrical connection box.

SUMMARY OF THE INVENTION

An object of the present invention is therefore to provide an electrical connection box and a wire harness with water resistance improved.

In order to achieve the above mentioned object, an electrical connection box according to one aspect of the present invention includes a housing, and at least one electronic component accommodated in the housing, wherein the housing includes an accommodation chamber in which the electronic component is accommodated, a wire outlet configured to draw out a wire electrically connected to the electronic component to an outside of the housing, and a wire routing space configured to guide the wire drawn out from the accommodation chamber to the wire outlet, the housing includes a wall having an inner wall surface that defines the wire routing space and configured to form an outer wall of the housing, and the wall includes a drain hole which is a through hole configured to communicate the wire routing space and the outside of the housing and configured to discharge liquid that flows from the wire outlet toward the inner wall surface to the outside of the housing, and the drain hole is formed in a first contact area of the inner wall surface toward which the liquid that enters the wire routing space through the wire outlet heads first.

According to another aspect of the present invention, in the electrical connection box, the first contact area may be formed with a plurality of drain holes.

According to still another aspect of the present invention, in the electrical connection box, the inner wall surface having the drain hole may include a contact wall surface that comes into contact with liquid entering the drain hole through an opening in the drain hole disposed in a side close to the outside of the housing, and the contact wall surface may be formed into an inclined plane so that a normal line at a contact point of the liquid faces the opening.

According to still another aspect of the present invention, in the electrical connection box, the wire outlet and the wire routing space may be formed by a first wire routing unit and a second wire routing unit, respectively included in a main housing and a sub-housing that are attached to each other, the main housing may include the accommodation chamber disposed inside the main housing, the first wire routing unit disposed in an outer wall surface of the main housing, and a wire insertion hole configured to lead the wire drawn out from the accommodation chamber to the first wire routing unit, and the sub-housing may include the second wire routing unit configured to cover the first wire routing unit and the wire insertion hole, and the wall formed with the drain hole.

According to still another aspect of the present invention, in the electrical connection box, the main housing may include a work opening which is an opening connected to the wire insertion hole and configured to communicate the inside and the outside of the main housing and which is configured to guide the wire drawn out from the accommodation chamber when inserting the wire into the wire insertion hole, and the sub-housing may include a closing wall configured to close the work opening, and a locking mechanism may be provided between the main housing and the sub-housing, and be configured to make the closing wall hold to the main housing engageably, the locking mechanism may include a first engagement body provided on the main housing and a second engagement body provided on the closing wall, being engageably held by the first engagement body when assembling the main housing and the sub-housing.

A wire harness according to still another aspect of the present invention includes an electrical connection box provided with a housing configured to accommodate at least one electronic component, and a wire that is electrically connected to the electronic component, wherein the housing includes an accommodation chamber configured to house the electronic component, a wire outlet configured to draw out the wire electrically connected to the electronic component from the housing, and a wire routing space configured to guide the wire drawn out from the accommodation chamber to the wire outlet, the housing includes a wall having an inner wall surface that defines the wire routing space and configured to form an outer wall of the housing, and the wall includes a drain hole which is a through hole configured to communicate the wire routing space and the outside of the housing and configured to discharge liquid that flows from the wire outlet toward the inner wall surface to the outside of the housing, and the drain hole is formed in a first contact area of the inner wall surface toward which the liquid that enters the wire routing space through the wire outlet heads first.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
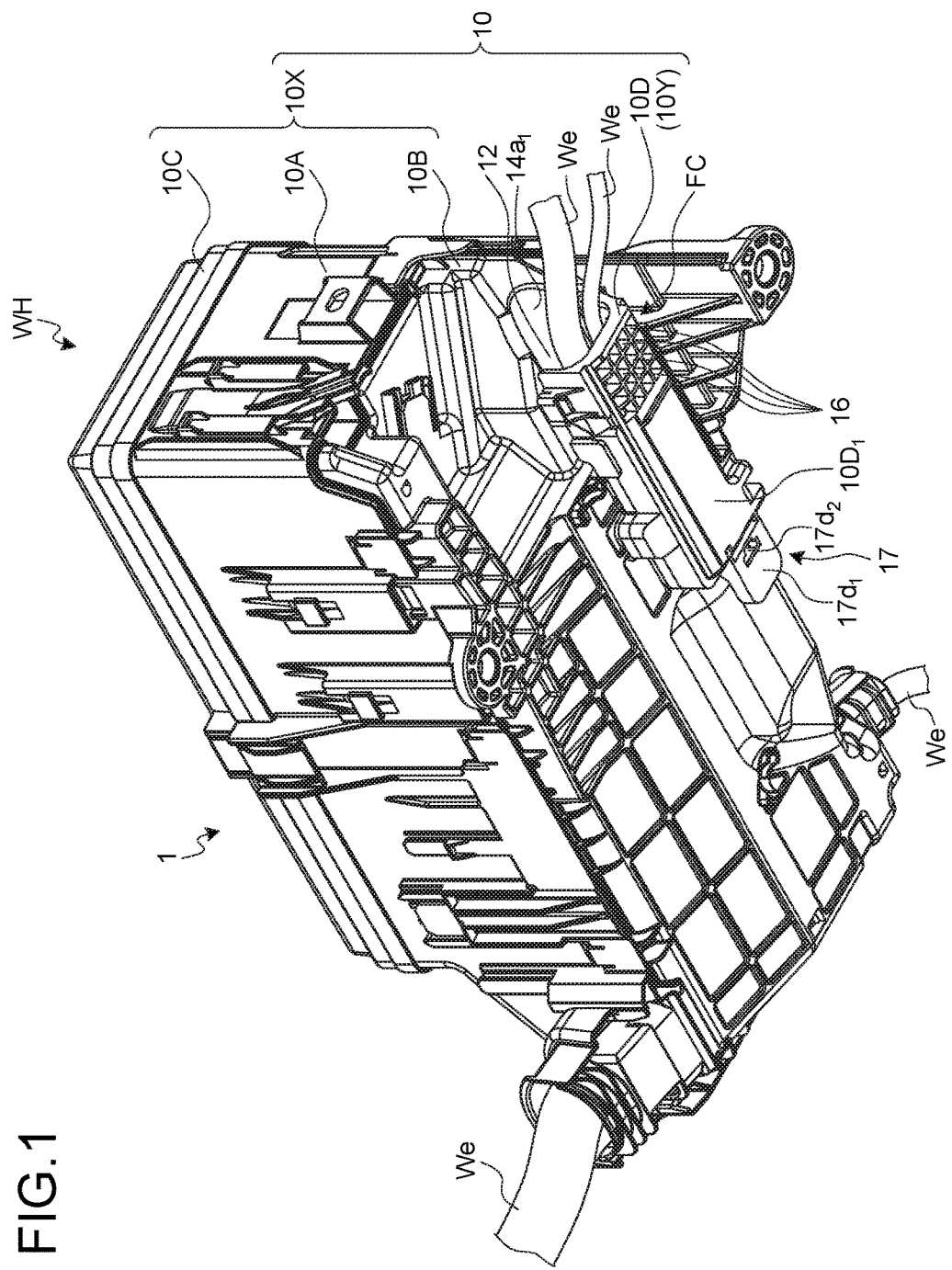
FIG. 1 is a perspective view illustrating an electrical connection box and a wire harness according to an embodiment.
Figure 2:
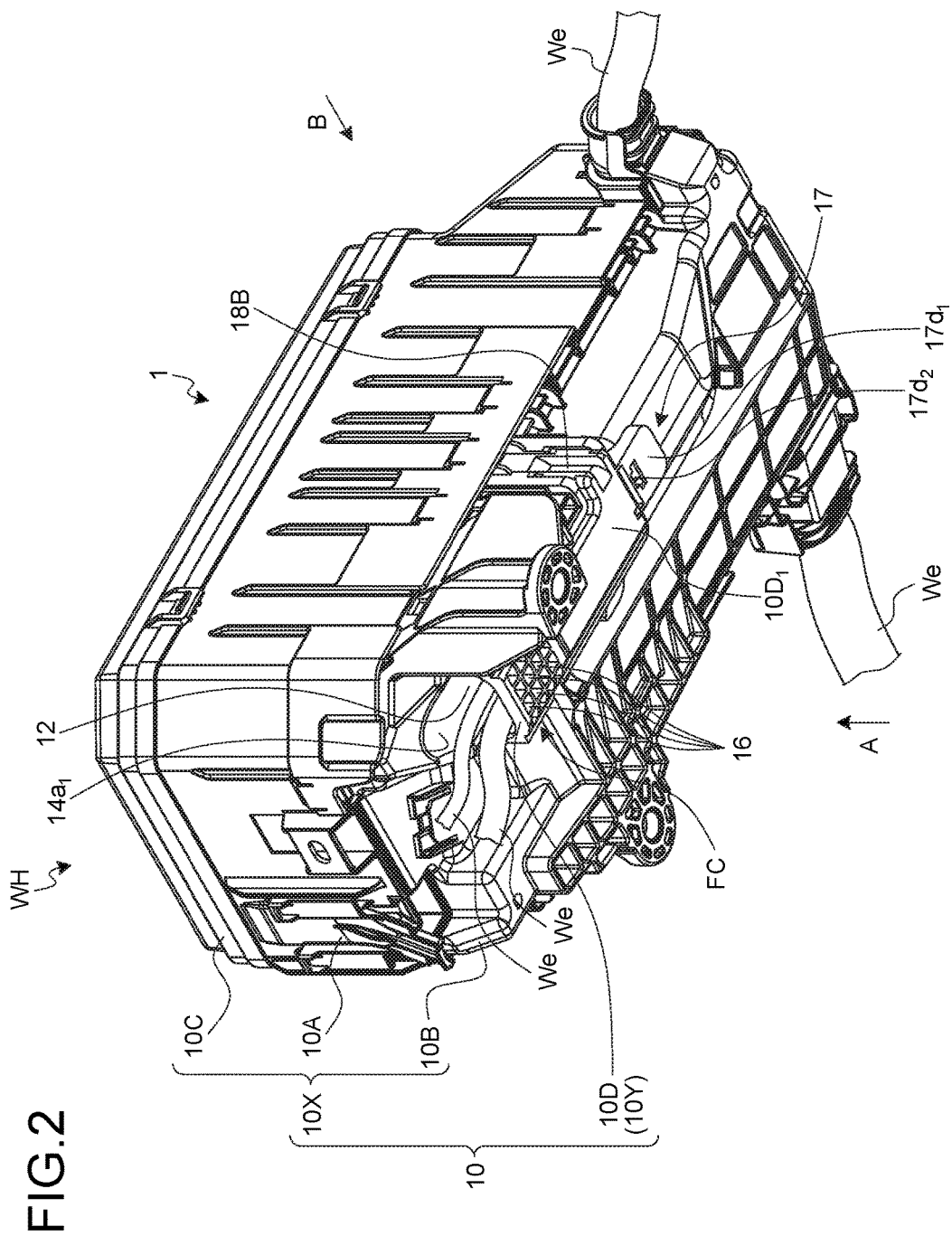
FIG. 2 is a perspective view illustrating the electrical connection box and the wire harness according to the embodiment from another angle.
Figure 3:
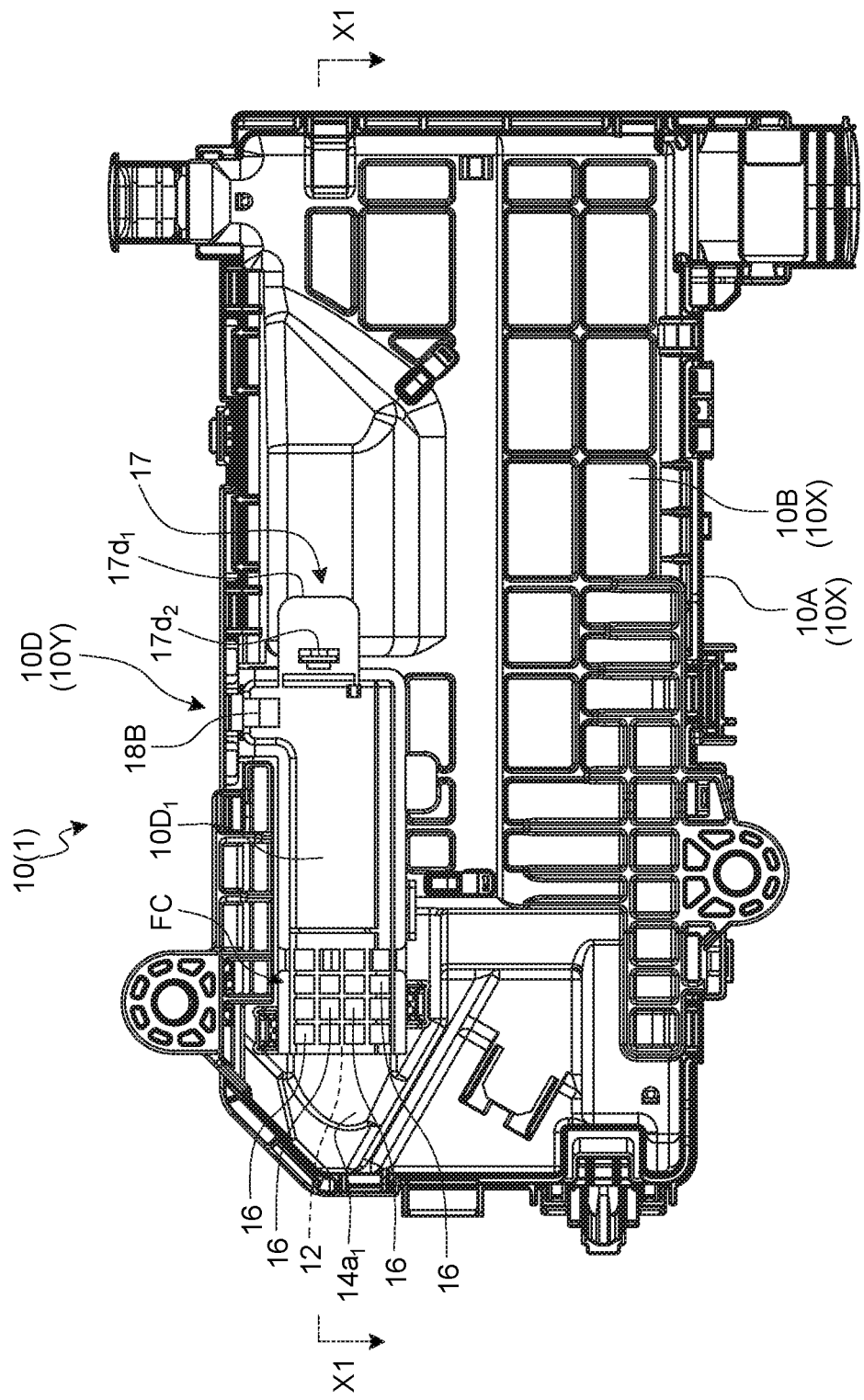
FIG. 3 is a plan view of the electrical connection box as seen in a direction indicated by the arrow A in FIG. 2.
Figure 4:
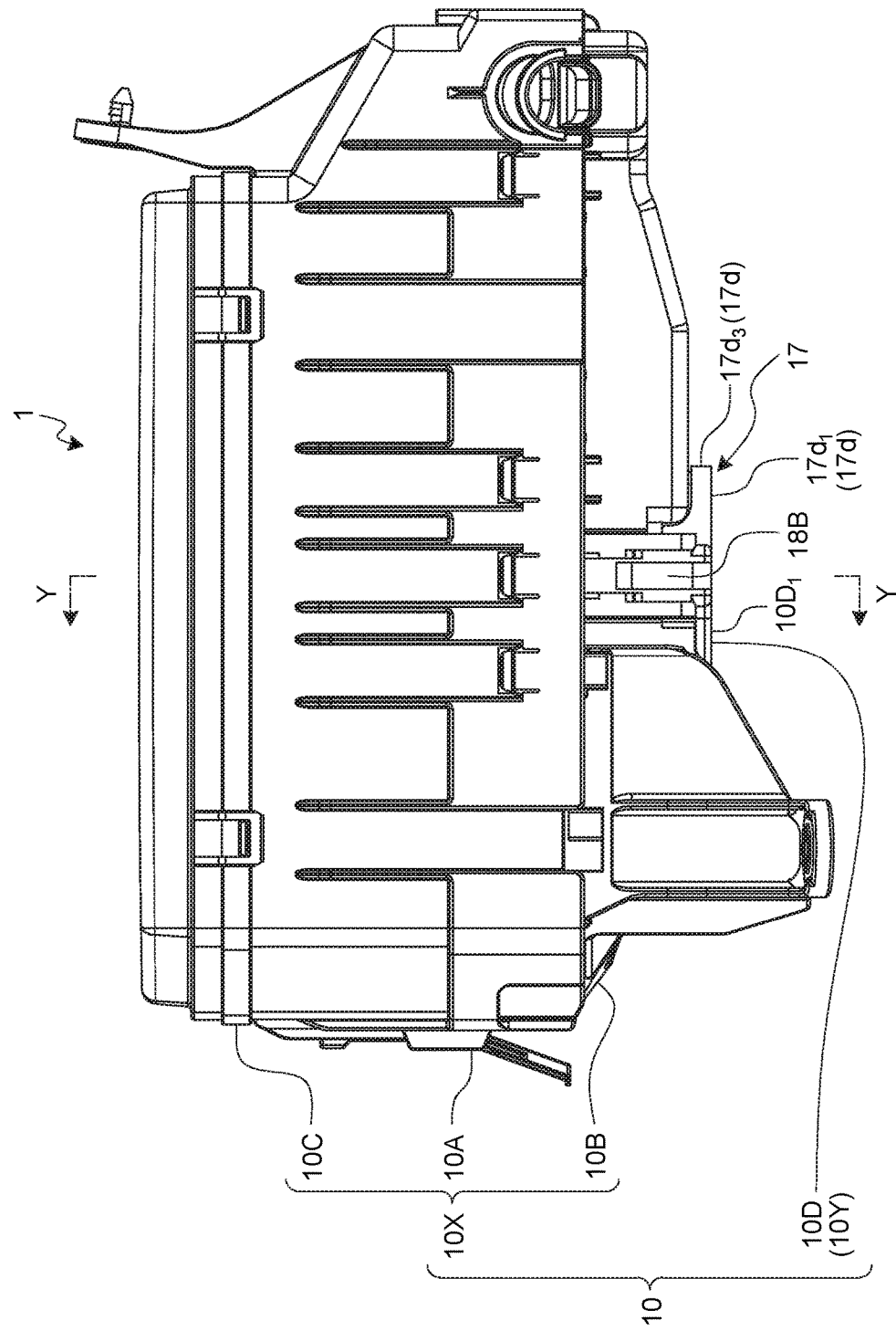
FIG. 4 is a plan view of the electrical connection box as seen in a direction indicated by the arrow B in FIG. 2.

An embodiment of an electrical connection box and a wire harness according to the present invention will be described hereinafter in detail with reference to the drawings. It should be noted that the present invention is not limited by this embodiment.

Embodiment

An embodiment of an electrical connection box and a wire harness according to the present invention will be described with reference to FIGS. 1 to 19.

Reference numeral 1 in FIGS. 1 to 5 denotes the electrical connection box of this embodiment. The reference numeral WH in FIG. 1 denotes the wire harness of this embodiment including the electrical connection box 1.

The electrical connection box 1 of this embodiment includes a housing 10, and at least one electronic component 20 (FIG. 5) as an object to be accommodated in the housing 10 (FIGS. 1 to 5). The electrical connection box 1 is installed, for example, in an engine compartment of a vehicle (not illustrated). In this electrical connection box 1, to-be-connected objects (not illustrated) mounted on a vehicle are electrically connected to the electronic component 20, and this electronic component 20 electrically connects at least two to-be-connected objects. Examples of the electronic component 20 include a circuit protection component such as a relay and a fuse, a connector, and a terminal fitting. In this embodiment, an electronic device such as a circuit board and an electronic control unit (ECU) is also considered as an embodiment of the electronic component 20 accommodated in the housing 10. Furthermore, in this embodiment, what is called an electronic component unit in which the electronic component 20 is accommodated in another housing is also considered as the object to be accommodated in the housing 10. In regard to the to-be-connected objects, examples thereof include a power source such as a secondary battery; a load device such as an electrical device (an actuator and the like); and a sensor.

In this electrical connection box 1, wires We (electricity supply lines, signal wires, and the like) that are electrically connected to the electronic component 20 are drawn out from the inside of the housing 10 (FIG. 1), and the electronic component 20 is electrically connected to the to-be-connected objects (a power source, a load device, a sensor, and the like) through these wires We. The electrical connection box 1 forms a wire harness WH together with the wires We. The drawing illustrates a state in which a plurality of wires We is bundled together by a protective member such as a protective tape or a corrugated tube.

Figure 5:
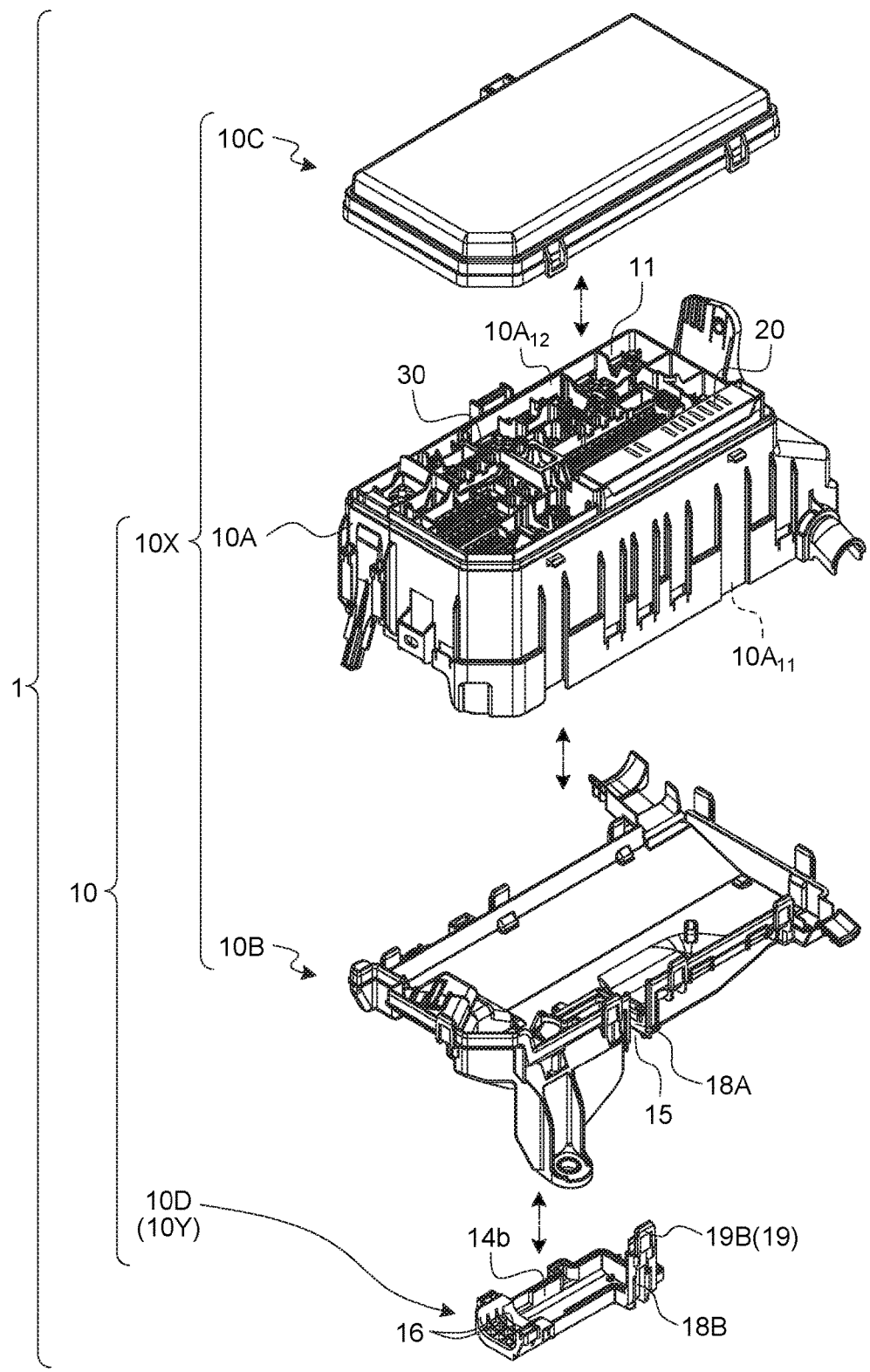
FIG. 5 is an exploded perspective view illustrating the electrical connection box of the embodiment.

The housing 10 illustrated herein includes a plurality of divided structures, being formed by assembling these structures. Each structure is formed of an insulating material such as a synthetic resin. This housing 10 is roughly divided into a main housing 10X and a sub-housing 10Y, being formed by assembling these housing (FIG. 1). The main housing 10X is a main part of the housing 10, and an accommodation chamber 11 configured to house the electronic component 20 is disposed inside the main housing 10X (FIG. 5). An assembly of the main housing 10X and the sub-housing 10Y forms a predetermined opening and a space. The opening is an outlet for the wires We drawn outside the housing 10, that is, a wire outlet 12 to be described later. The space is a guide channel configured to guide the wires We drawn out from the accommodation chamber 11 to the wire outlet 12, that is, a wire routing space 13 to be described later.

Examples of each structure included in the housing 10 illustrated herein (FIGS. 1, 2, 4, and 5) include a frame 10A which is a housing body of the electronic component 20, a lower cover 10B which closes one of two main openings $10A_{11}$, $10A_{12}$ (FIG. 5) in this frame 10A (that is, the main opening $10A_{11}$), and an upper cover 10C which closes the other opening of the two main openings $10A_{11}$, $10A_{12}$ (that is, the main opening $10A_{12}$). In the housing 10, the lower cover 10B and the upper cover 10C are attached to the frame 10A, thereby forming the main housing 10X. This housing 10 also includes a sub-cover 10D attached to the lower cover 10B (FIGS. 1 and 2, and FIGS. 4 to 7). In this housing 10, the sub-cover 10D is the sub-housing 10Y.

The housing 10 includes the accommodation chamber 11 that houses the electronic component 20 (FIG. 5). In this housing 10, a space inside the frame 10A having a square tubular shape is used as the accommodation chamber 11. The accommodation chamber 11 houses and fixes a holding member 30 configured to hold the electronic component 20. The holding member 30 is called a block in this technical field, being formed of an insulating material such as a synthetic resin. The holding member 30 includes a housing space to house the electronic component 20, holding the electronic component 20 in this housing space. For example, the electronic component 20 is physically and electrically connected to the wires We in this housing space. In other words, the electronic component 20 and the wires We are accommodated and held in the accommodation chamber 11 through the holding member 30, and portions where the electronic component 20 and the wires We are electrically connected are disposed in the housing 11.

The housing 10 also includes the wire outlet 12 (FIGS. 1 to 3) configured to draw out the wires We from the inside of the housing 10, and the space (hereinafter referred to as the "wire routing space") 13 configured to guide the wires We drawn out from the accommodation chamber 11 to the wire outlet 12 (FIGS. to 9). In this housing 10, the wires We are drawn out from the accommodation chamber 11 toward the lower cover 10B so that the wire outlet 12 and the wire routing space 13 are disposed on a side close to the lower cover 10B.

The wire outlet 12 and the wire routing space 13 illustrated herein are formed by a first wire routing unit 14a and a second wire routing unit 14b respectively included in the main housing 10X and the sub-housing 10Y which are attached to each other (FIGS. 6 to 9).

Figure 6:
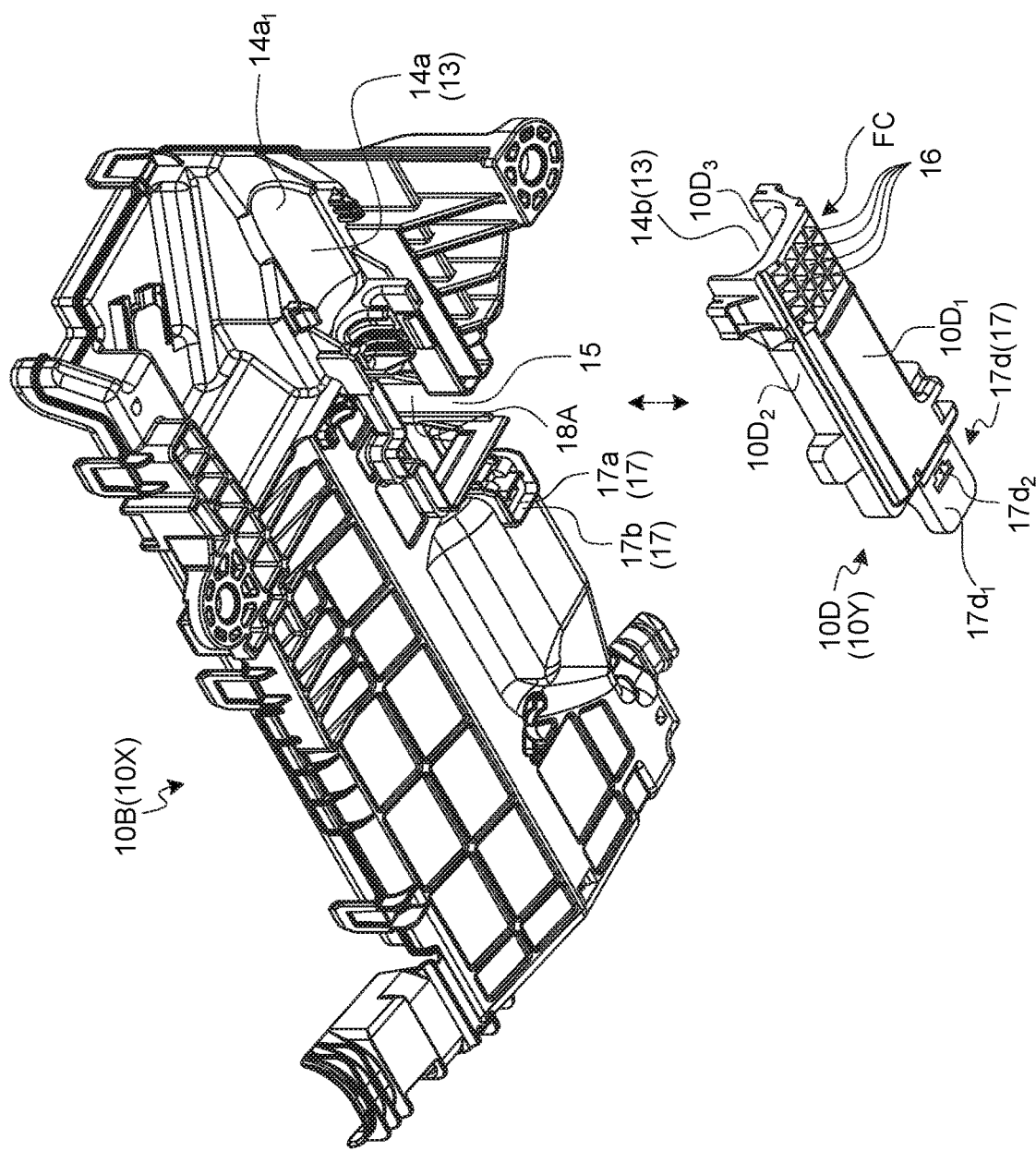
FIG. 6 is an exploded perspective view of a lower cover and a sub-cover before assembly.
Figure 7:
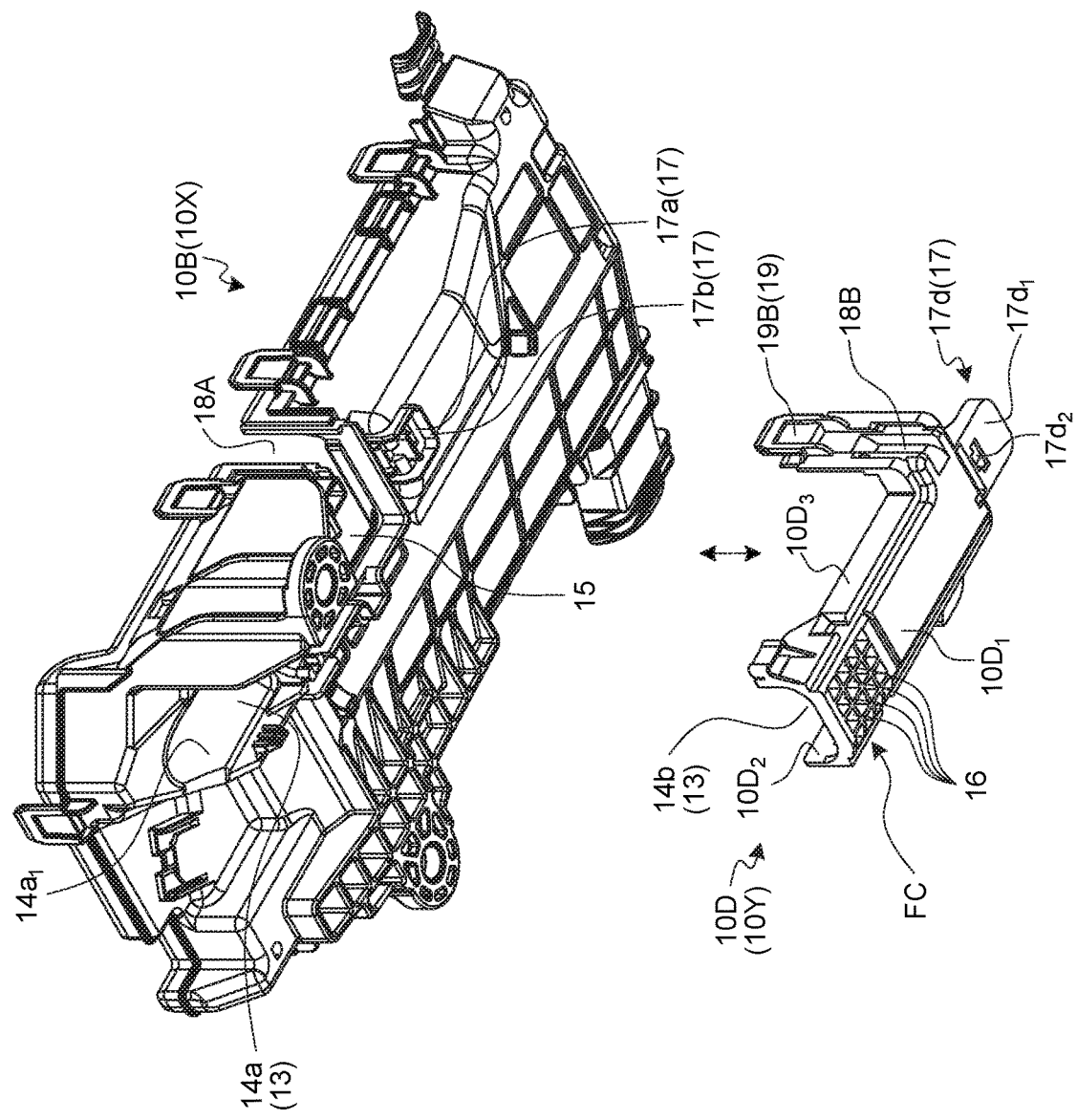
FIG. 7 is an exploded perspective view illustrating the lower cover and the sub-cover before assembly from another angle.
Figure 8:
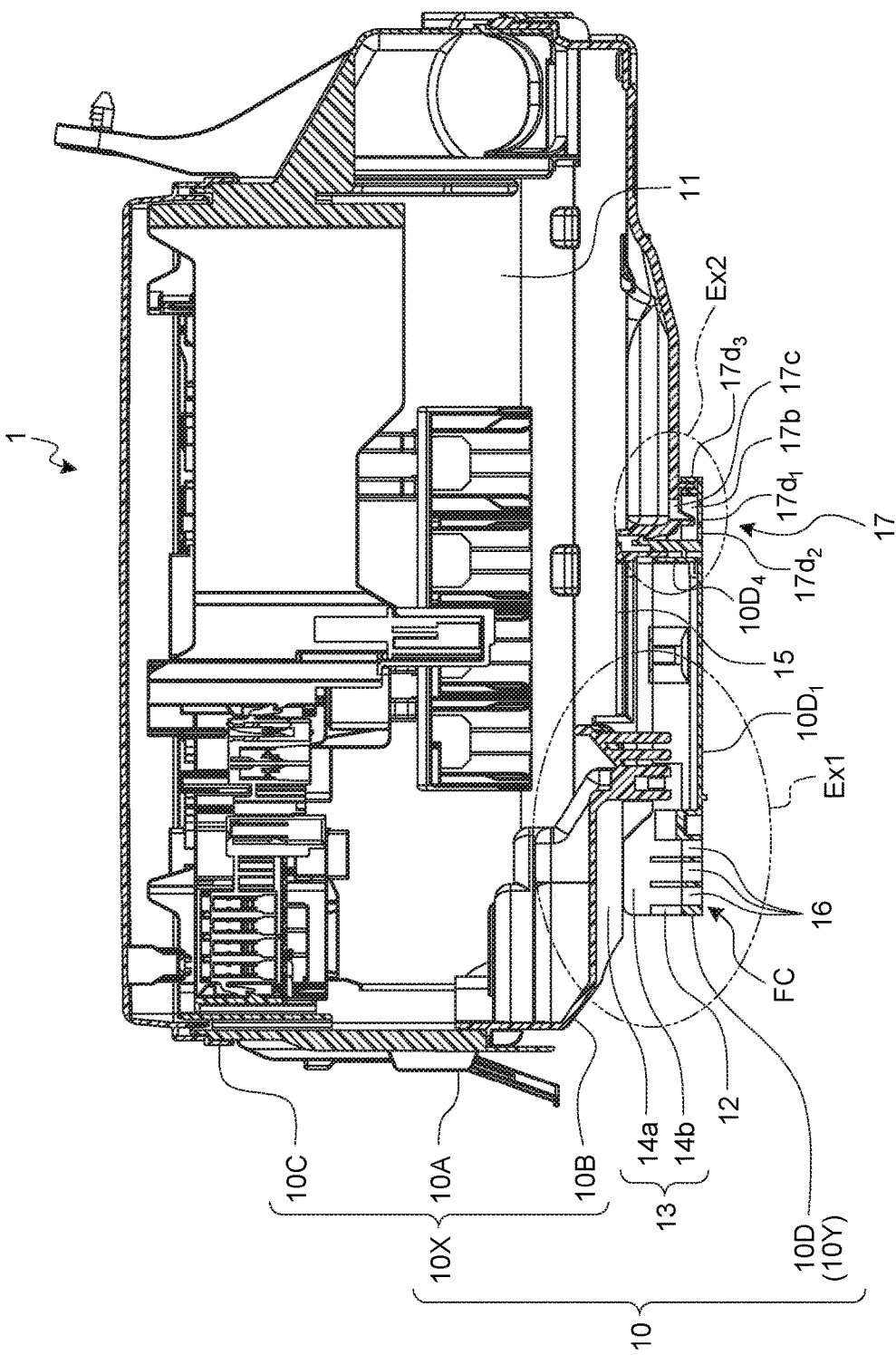
FIG. 8 is a cross-sectional view taken along the line X1-X1 in FIG. 3.
Figure 9:
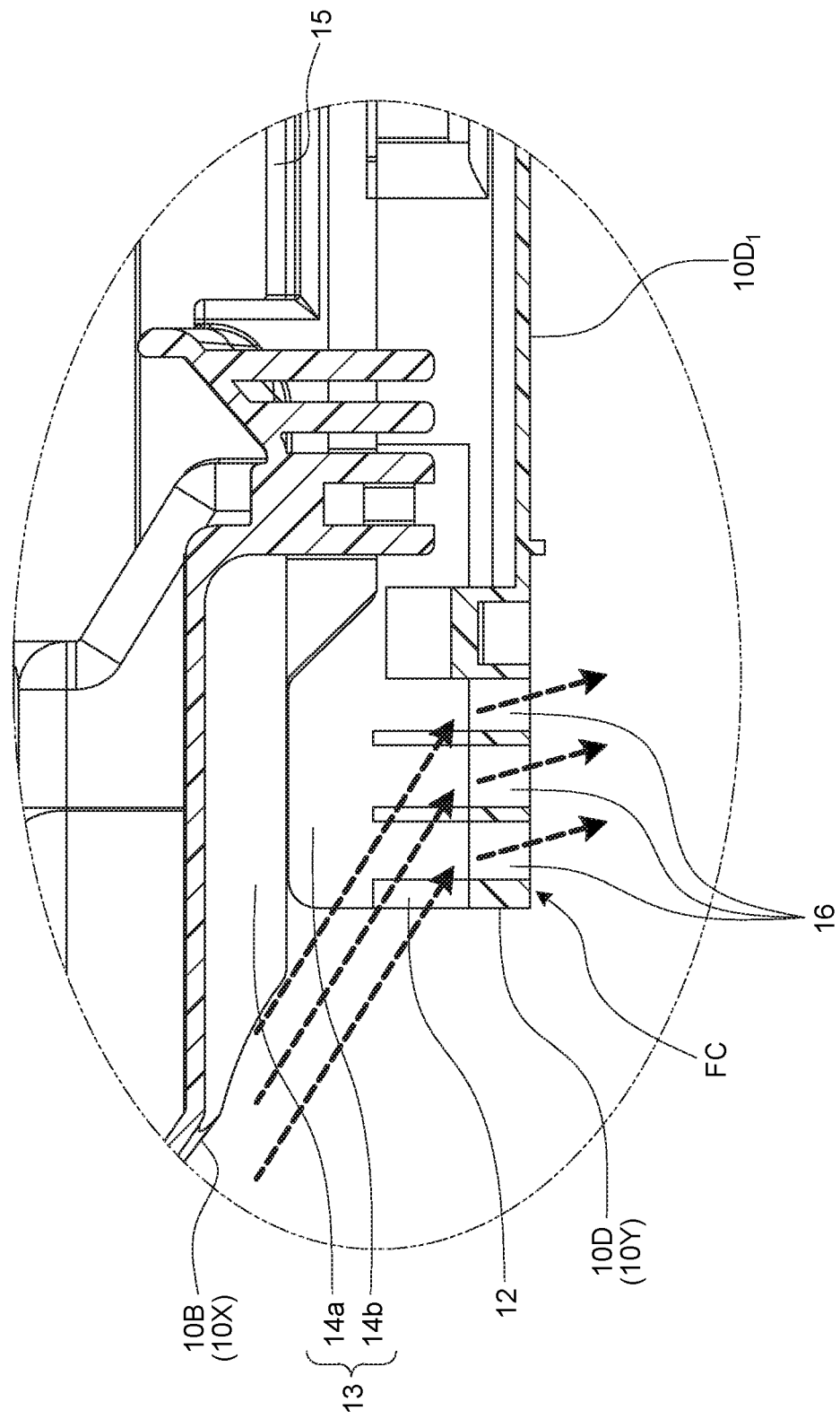
FIG. 9 is an enlarged view of an Ex1 part illustrated in FIG. 8.

The first wire routing unit 14a is disposed on an outer wall surface of the main housing 10X, being formed into a spatial portion obtained by partially recessing an outer wall surface of the lower cover 10B. Herein, the first wire routing unit 14a includes an arcuate wall surface 14a₁ that is recessed into a semicircular arch (FIGS. 6 and 7). The arcuate wall surface 14a₁ has one end formed with a through hole (hereinafter referred to as a "wire insertion hole") 15 configured to lead the wires We drawn out from the accommodation chamber 11 to the first wire routing unit 14a (that is, the wire routing space 13) (FIGS. 6 to 9). The wire insertion hole 15 is a through hole configured to communicate the inside and the outside of the lower cover 10B (that is, the main housing 10X), allowing the wires We to insert into the wire insertion hole 15.

The second wire routing unit 14b is provided on the sub-cover 10D serving as the sub-housing 10Y. The sub-cover 10D is formed into a half square tubular shape, and a spatial portion inside the sub-cover 10D is used as the second wire routing unit 14b. The sub-cover 10D is formed in such a manner that the second wire routing unit 14b covers the first wire routing unit 14a and the wire insertion hole 15 when being attached to the lower cover 10B. The sub-cover 10D includes a rectangular wall 10D₁ as a main part; and two rectangular upright walls 10D₂, and 10D₃ erected from opposing sides of the wall 10D₁ (FIGS. 6 and 7). The sub-cover 10D also includes a rectangular upright wall 10D₄ erected from one end of the wall 10D₁ (FIGS. 8 and 10), closing an opening on one end with the upright wall 10D₄. In this sub-cover 10D, an opening on the other end is used as a part of the wire outlet 12.

In the housing 10, in assembling the lower cover 10B and the sub-cover 10D, the first wire routing unit 14a and the second wire routing unit 14b form the wire routing space 13, and the first wire routing unit 14a and the second wire routing unit 14b also form the opening on the other end. In this housing 10, the opening is used as the wire outlet 12. Therefore, in the wire routing space 13, the wires We led from the wire insertion hole 15 on one end are guided to the wire outlet 12 on the other end. The wires We are drawn outside the housing 10 through the wire outlet 12.

Furthermore, in the housing 10, a through hole (hereinafter referred to as a "drain hole") 16 configured to communicate the wire routing space 13 and the outside of the housing 10 is provided on a wall which includes an inner wall surface forming the wire routing space 13 and which forms an outer wall of the housing 10 (FIGS. 1 to 3, and FIGS. 5 to 9). The drain hole 16 serves as a through hole configured to discharge liquid, which enters through the wire outlet 12 toward the inner wall surface forming the wire routing space 13, to the outside of the housing 10. In the inner wall surface that forms the wire routing space 13, the drain hole 16 is formed on the inner wall surface toward which the liquid entering the wire routing space 13 through the wire outlet 12 heads first. In other words, in the inner wall surface, the drain hole 16 is formed in an area (hereinafter referred to as a "first contact area") FC with which the liquid entering the wire routing space 13 through the wire outlet 12 may come into contact in the first place (FIGS. 1 to 3, and FIGS. 6 to 9). In order to enhance water resistance, for example, when splashing liquid directly to the wire outlet 12 in a high-pressure cleaning test, the first contact area FC may be defined in consideration of an angle of the liquid that enters the wire routing space 13 through the wire outlet 12. At least one drain hole 16 is formed in the first contact area FC.

Herein, in the inner wall surface of the wall 10D₁ of the sub-cover 10D, a side close to the wire outlet 12 corresponds to the first contact area FC. The wall 10D₁ of the sub-cover 10D illustrated herein is formed with a plurality of drain holes 16 disposed in a lattice pattern in the first contact area FC.

This electrical connection box 1 is provided with such a drain hole 16 so that the liquid entering the wire routing space 13 through the wire outlet 12 is discharged outside the housing 10 through the drain hole 16. Accordingly, in this electrical connection box 1, it is possible to prevent the liquid entering the wire routing space 13 through the wire outlet 12 from flowing toward the wire insertion hole 15. Therefore, even when rushing liquid such as one used in a high-pressure cleaning test enters the electrical connection box 1 through the wire outlet 12, it is possible to prevent the liquid from flowing toward the accommodation chamber 11 through the wire insertion hole 15.

Figure 10:
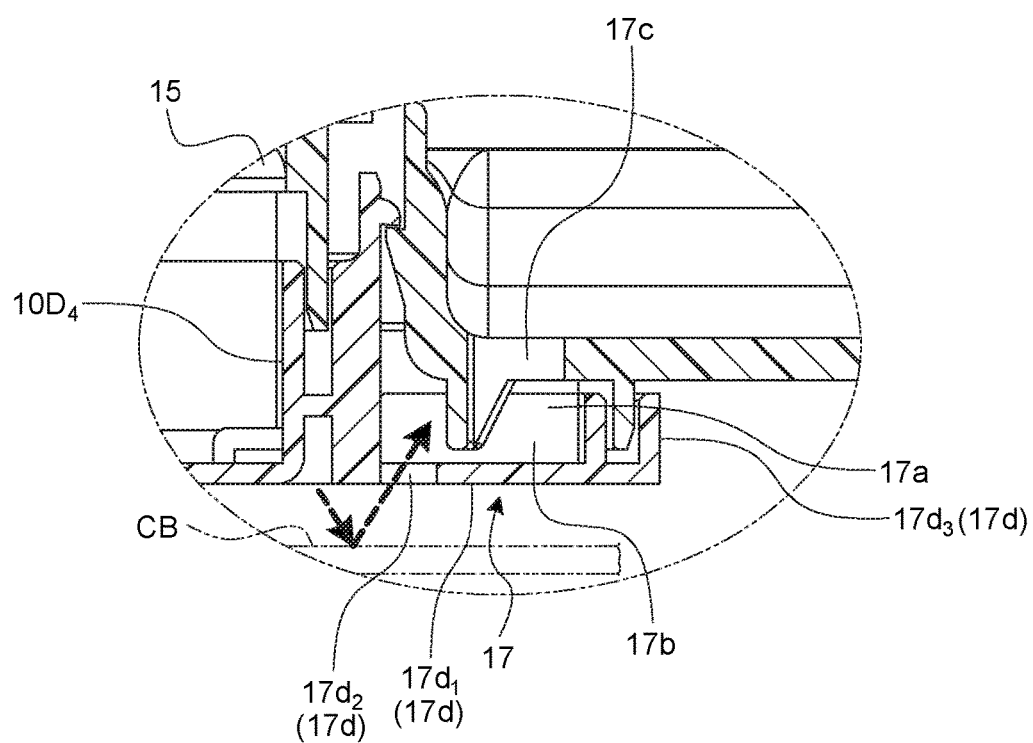
FIG. 10 is an enlarged view of an Ex2 part illustrated in FIG. 8.

By the way, this electrical connection box 1 is provided with a drainage unit 17 configured to discharge liquid such as bedewing, which is formed inside the main housing 10X, to the outside of the housing 10 (FIGS. 6 to 8, and FIG. 10). The drainage unit 17 illustrated herein is provided on the lower cover 10B. The drainage unit 17 includes, for example, a drainage channel 17a configured to discharge liquid, being surrounded by a plurality of walls, an opening (drainage port) 17b disposed in the drainage channel 17a, facing the outside of the housing 10, and a communication hole 17c configured to communicate the drainage channel 17a and the accommodation chamber 11 (FIG. 10). Furthermore, the drainage unit 17 includes an entry prevention body 17$d$ configured to prevent entry of the liquid through the drainage port 17$b$ so as to prevent the flow of the liquid toward the accommodation chamber 11 (FIG. 10). The entry prevention body 17$d$ surrounds the drainage channel 17$a$ from the outside thereof. The drainage unit 17 is protrusively provided on the sub-cover 10D.

The entry prevention body 17$d$ illustrated herein includes a wall (hereinafter referred to as an "entry prevention wall") 17$d_1$ disposed opposite to the drainage port 17$b$ at an interval, and a second drainage port 17$d_2$ configured to discharge liquid discharged from the drainage port (first drainage port) 17$b$ to the outside of the housing 10. In the drainage unit 17, the liquid discharged from the first drainage port 17$b$ is discharged outside the housing 10 through the second drainage port 17$d_2$. In this drainage unit 17, the second drainage port 17$d_2$ is not disposed opposite to the first drainage port 17$b$ so that it is possible to prevent liquid, which enters the second drainage port 17$d_2$ from the outside of the housing 10, from flowing toward the first drainage port 17$b$. For example, liquid outside the housing 10 bounces off a car body CB and enters inside the housing 10 through the second drainage port 17$d_2$ (the arrow illustrated in FIG. 10). Herein, the liquid entering in this manner touches a wall that forms the drainage channel 17$a$. Therefore, even when the liquid outside the housing 10 enters through the second drainage port 17$d_2$, the electrical connection box 1 is capable of preventing the liquid from flowing toward the accommodation chamber 11 through the drainage unit 17.

Furthermore, the entry prevention body 17$d$ illustrated herein includes an upright wall 17$d_3$ that surrounds the drainage channel 17$a$ from the outside thereof. The upright wall 17$d_3$ is formed into what is called a double wall, being configured to fit the wall that forms the drainage channel 17$a$ into a gap between wall portions of the double wall. In other words, the drainage unit 17 has what is called a labyrinthine structure between the lower cover 10B and the sub-cover 10D, and a channel length between the outside of the housing 10 and the drainage channel 17$a$ in the upright wall 17$d_3$ is made long. Therefore, in this electrical connection box 1, at a fitting portion of the lower cover 10B and the sub-cover 10D in the drainage unit 17, it is possible to prevent entry of the liquid outside the housing 10 toward the drainage channel 17$a$. Accordingly, from this point of view, the electrical connection box 1 is capable of preventing the liquid outside the housing 10 from flowing toward the accommodation chamber 11 due to this drainage unit 17.

In the electrical connection box 1, the main housing 10X includes an opening (hereinafter referred to as a "work opening") 18A configured to guide the wires We drawn out from the accommodation chamber 11 when inserting the wires We into the wire insertion hole 15 (FIGS. 5 to 7, and FIG. 11). The work opening 18A is an opening connected to the wire insertion hole 15, communicating the inside and the outside of the main housing 10X. The work opening 18A is provided in the lower cover 10B that includes the wire insertion hole 15. Herein, the work opening 18A is formed as a rectangular notch on an intersecting wall of the lower cover 10B that intersects with the wire insertion hole 15. Herein, a square tubular end of the lower cover 10B on a side close to the frame 10A is accommodated inside the frame 10A so that a portion of the work opening 18A that is to be accommodated is covered with the frame 10A.

Furthermore, in this electrical connection box 1, the sub-cover 10D serving as the sub-housing 10Y includes a rectangular wall (hereinafter referred to as a "closing wall") 18B configured to close the work opening 18A (FIGS. 2 to 5, FIG. 7, and FIG. 11). The closing wall 18B is erected from the wall 10D$_1$ in the same direction as the upright wall 10D$_3$, being fitted into the work opening 18A at the time of assembly of the sub-cover 10D and the lower cover 10B. Therefore, in the lower cover 10B, the rim of the work opening 18A is formed into what is called a double wall, and a gap between wall portions thereof is used as a guide portion when fitting the closing wall 18B.

Figure 11:
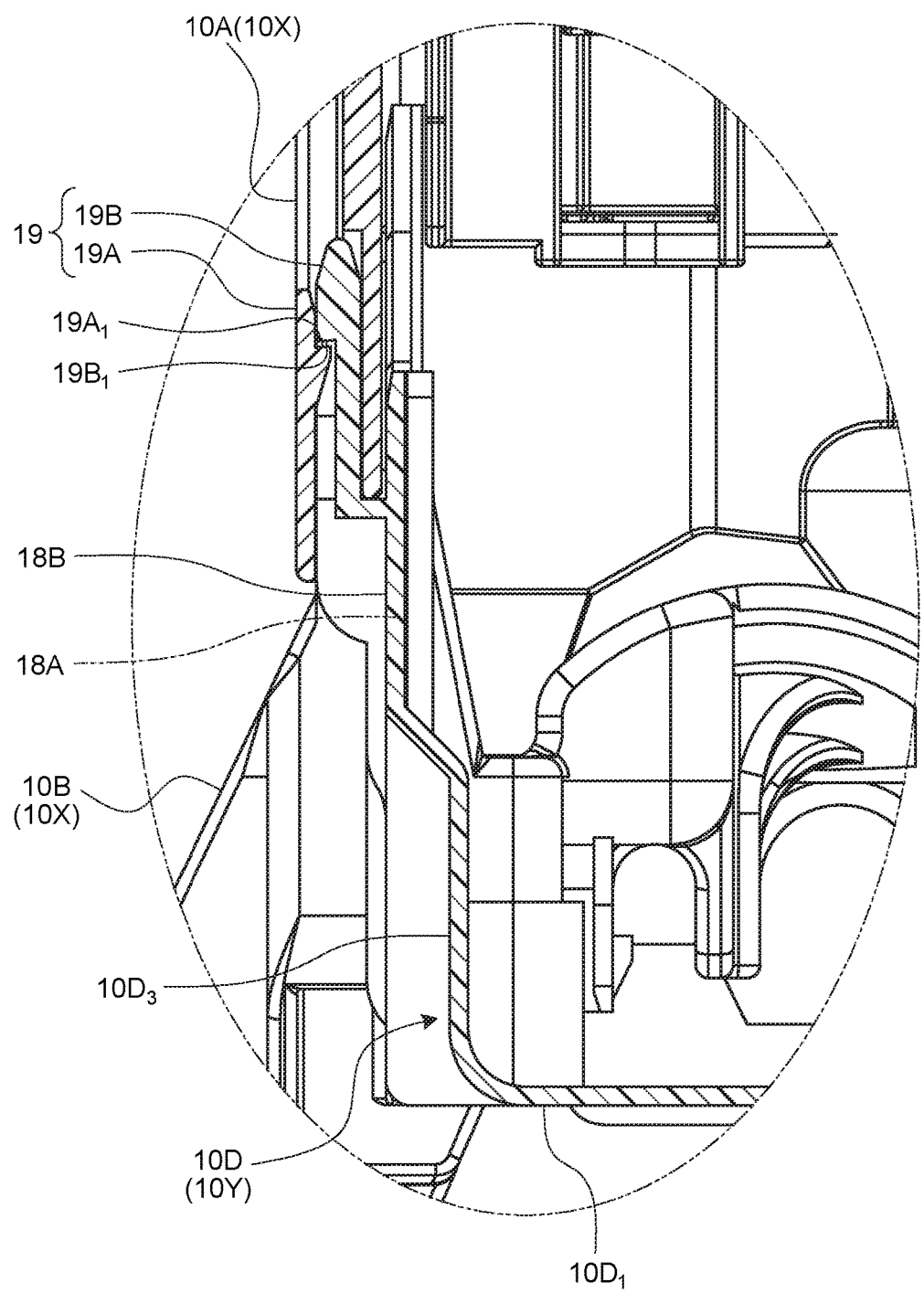
FIG. 11 is a cross-sectional view taken along the line Y-Y in FIG. 4, and is an enlarged view of the rim of a work opening and a closing wall.

Herein, a locking mechanism 19 is provided between the main housing 10X and the sub-housing 10Y (FIG. 11). The main housing 10X engageably holds the closing wall 18B due to the locking mechanism 19. The locking mechanism 19 includes a first engagement body 19A provided on the main housing 10X; and a second engagement body 19B provided on the closing wall 18B, being engageably held by the first engagement body 19A when assembling the main housing 10X and the sub-housing 10Y. Herein, the first engagement body 19A is provided on the frame 10A, and the second engagement body 19B is protrusively provided on a wall surface of the closing wall 18B. The first engagement body 19A and the second engagement body 19B respectively have claw portions 19A$_1$ and 19B$_1$. For example, when the sub-cover 10D is attached to the frame 10A together with the lower cover 10B, the claw portions 19A$_1$ and 19B$_1$ are hooked with each other.

For purpose of improvement in assembly workability with respect to the work opening 18A and for purpose of weight saving, the closing wall 18B is reduced in plate thickness so that the closing wall 18B may have been deflected within a design tolerance, or may be deflected by external force and the like. Therefore, in a case where the closing wall 18B is deflected, a gap may be formed between the closing wall 18B and the rim of the work opening 18A. However, in this electrical connection box 1, the locking mechanism 19 firmly fixes the closing wall 18B to the frame 10A so that it is possible to reduce an amount of deflection of the closing wall 18B. Accordingly, in this electrical connection box 1, it is possible to suppress gap formation between the rim of the work opening 18A and the closing wall 18B, which prevents entry of the liquid outside the housing 10 toward the accommodation chamber 11 through the gap.

As described above, in the electrical connection box 1 according to this embodiment, the liquid entering the wire routing space 13 through the wire outlet 12 can be discharged through the drain hole 16 to the outside of the housing 10. Furthermore, in the electrical connection box 1, the drainage unit 17 is provided with the entry prevention body 17$d$ covering the first drainage port 17$b$ from the outside of the housing 10 while ensuring a drainage function of the first drainage port 17$b$ so that it is possible to prevent the liquid outside the housing 10 from entering the accommodation chamber 11 through the first drainage port 17$b$. Since the electrical connection box 1 is provided with the locking mechanism 19 capable of reducing the amount of deflection of the closing wall 18B, it is possible to prevent entry of the liquid outside the housing 10 toward the accommodation chamber 11 through the gap between the rim of the work opening 18A and the closing wall 18B.

As described above, the electrical connection box 1 of this embodiment has excellent water resistance and is capable of preventing the liquid outside the housing 10 from flowing into the accommodation chamber 11. Therefore, in this electrical connection box 1, the liquid is less likely to contact the electronic component 20 of the accommodation chamber 11, which leads to an improvement in durability of the electronic component 20 or of the wires We connected to the electronic component 20. Furthermore, the wire harness WH of this embodiment includes the electrical connection box 1 so that it is possible to exert an effect of the electrical connection box 1.

Figure 12:
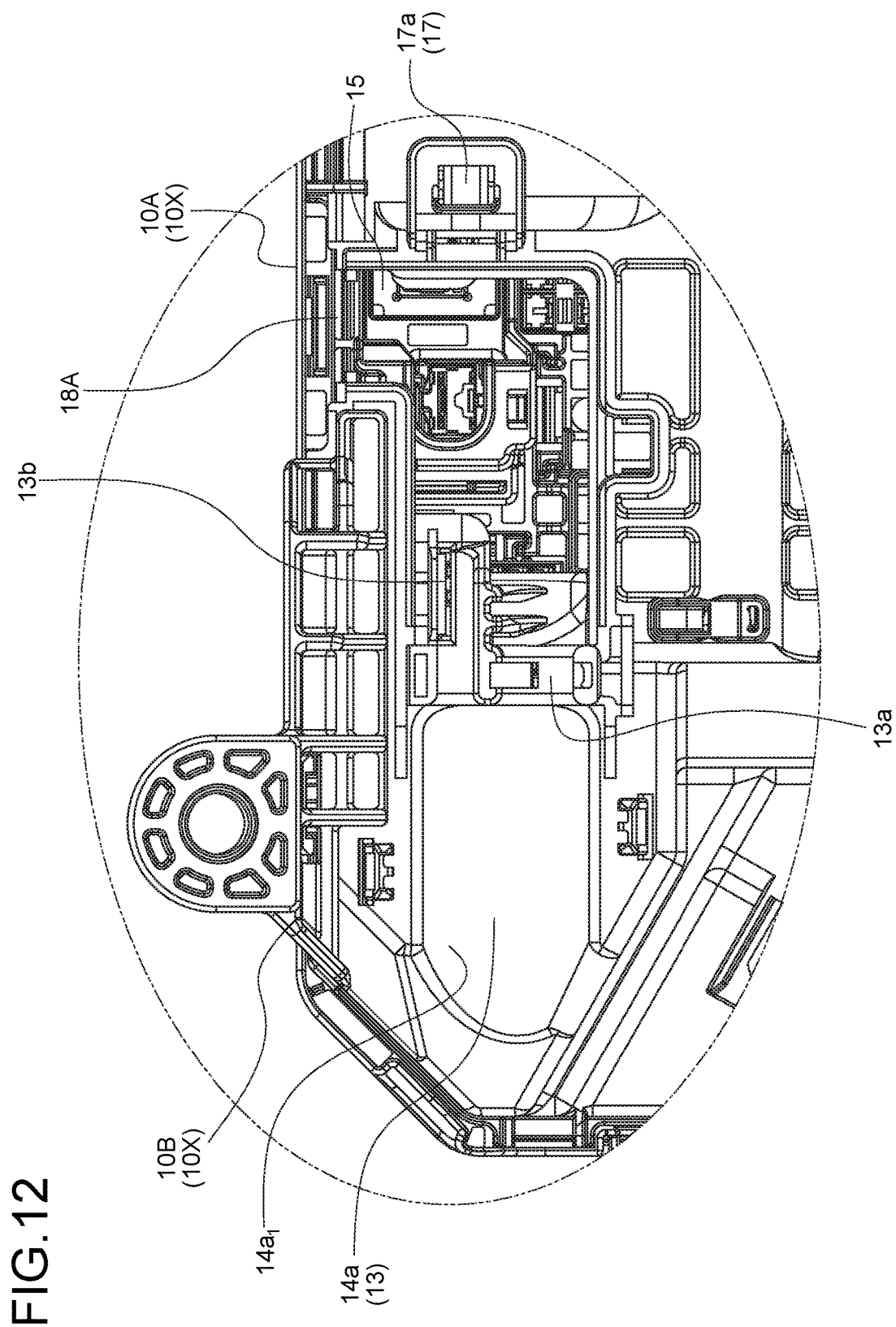
FIG. 12 is a plan view illustrating a wire routing channel of the electrical connection box of the embodiment.
Figure 13:
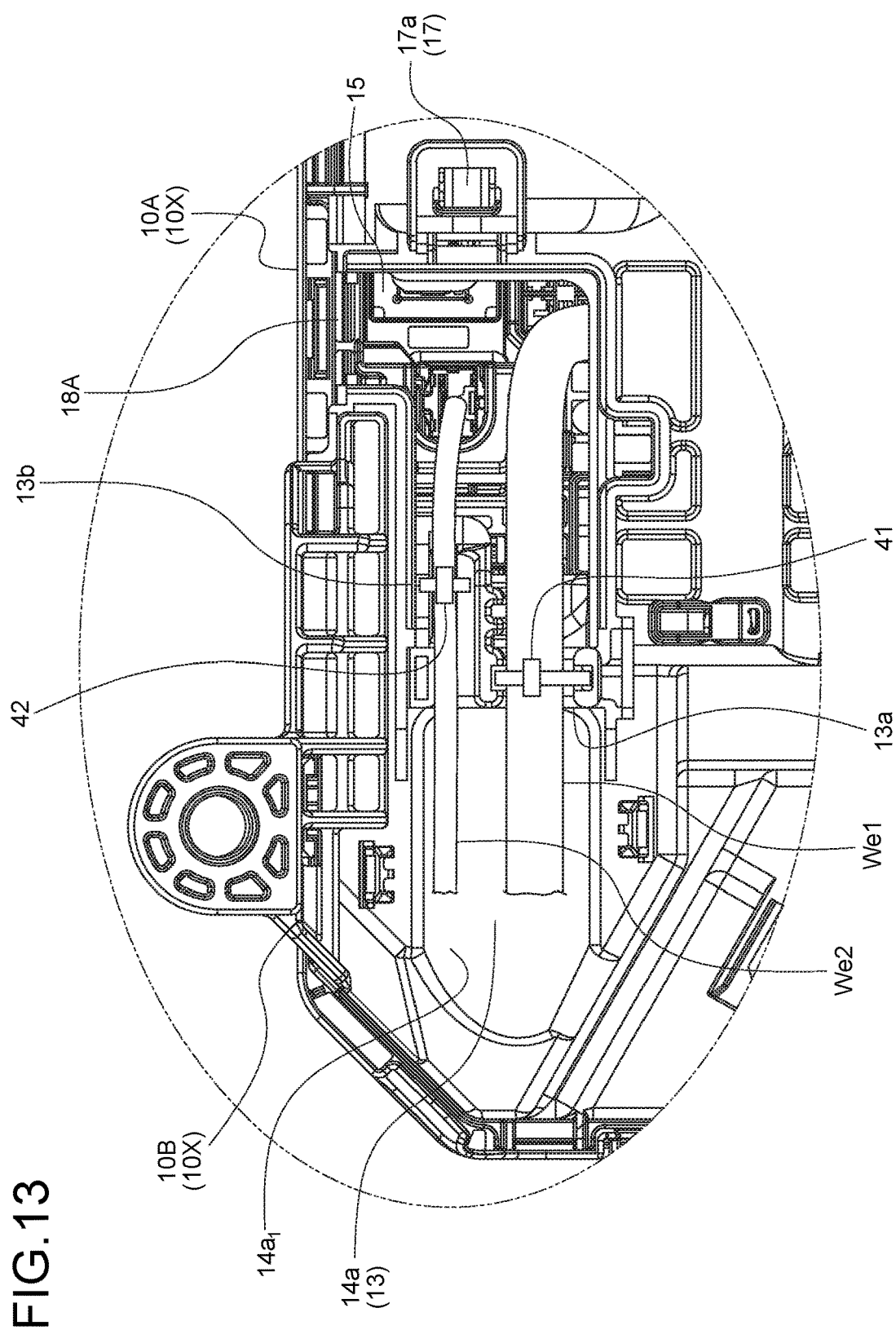
FIG. 13 is a plan view illustrating the wire routing channel of the electrical connection box of the embodiment together with wires.
Figure 14:
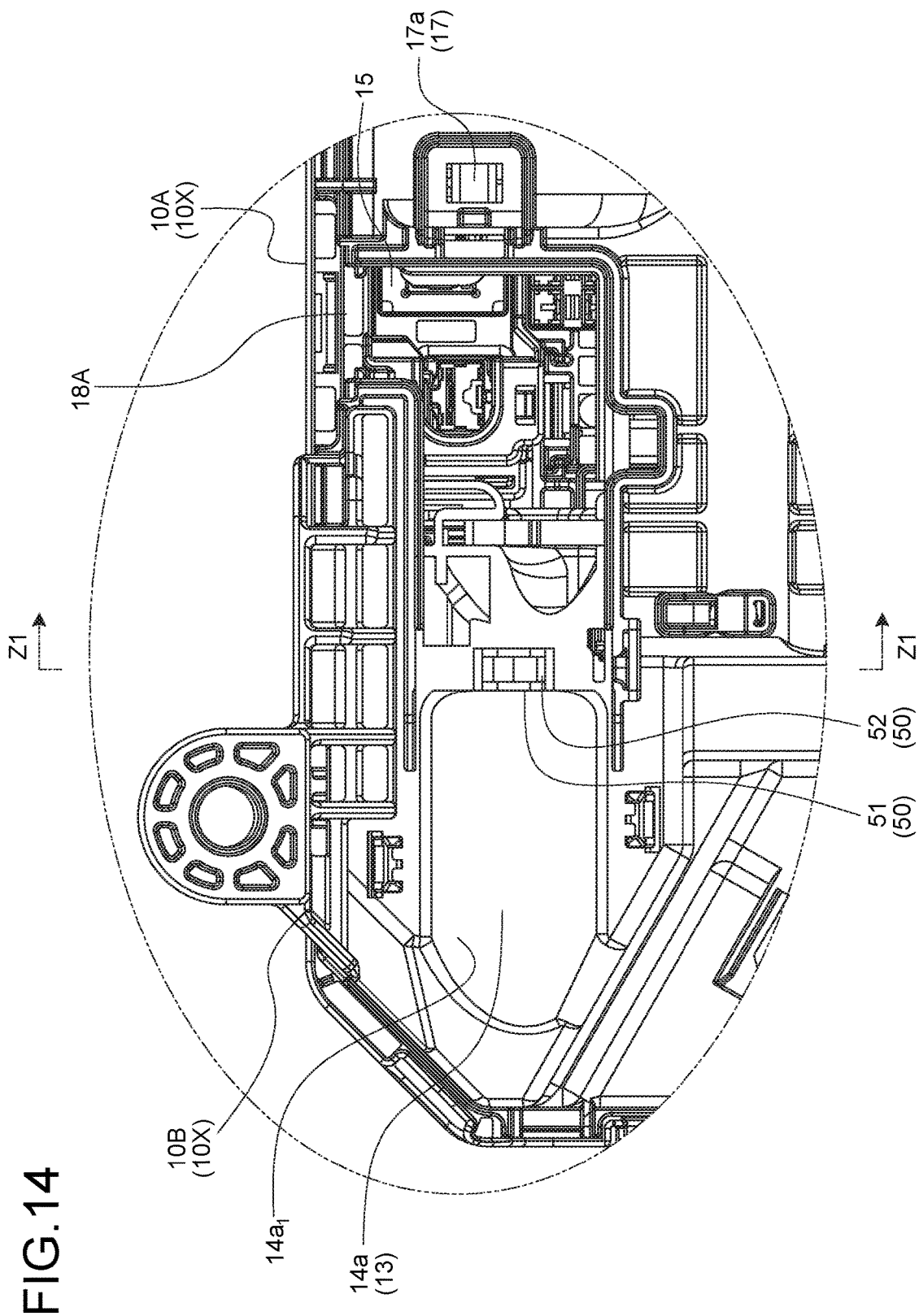
FIG. 14 is a plan view illustrating a wire routing channel according to another embodiment.

In the wire routing space 13 of this embodiment, it should be noted that two kinds of wires We having different diameters are routed. Herein, the wire We having the larger diameter may be referred to as a large diameter wire We1, and the wire We having the smaller diameter may be referred to as a small diameter wire We2. In the wire routing space 13, the large diameter wire We1 and the small diameter wire We2 are respectively held at holding portions 13*a* and 13*b* by binding bands 41 and 42 of each corresponding wire We (FIGS. 12 and 13). The holding portions 13*a* and 13*b* are formed in the lower cover 10B, respectively allowing the binding bands 41 and 42 before binding to insert into the holding portions 13*a* and 13*b*. However, in this embodiment, it is required to tighten the bands at two places. Therefore, the wire routing space 13 may be provided with a holding mechanism 50 configured to hold the large diameter wire We1 and the small diameter wire We2 by bundling together with one binding band 43 (FIGS. 14 to 17).

Figure 15:
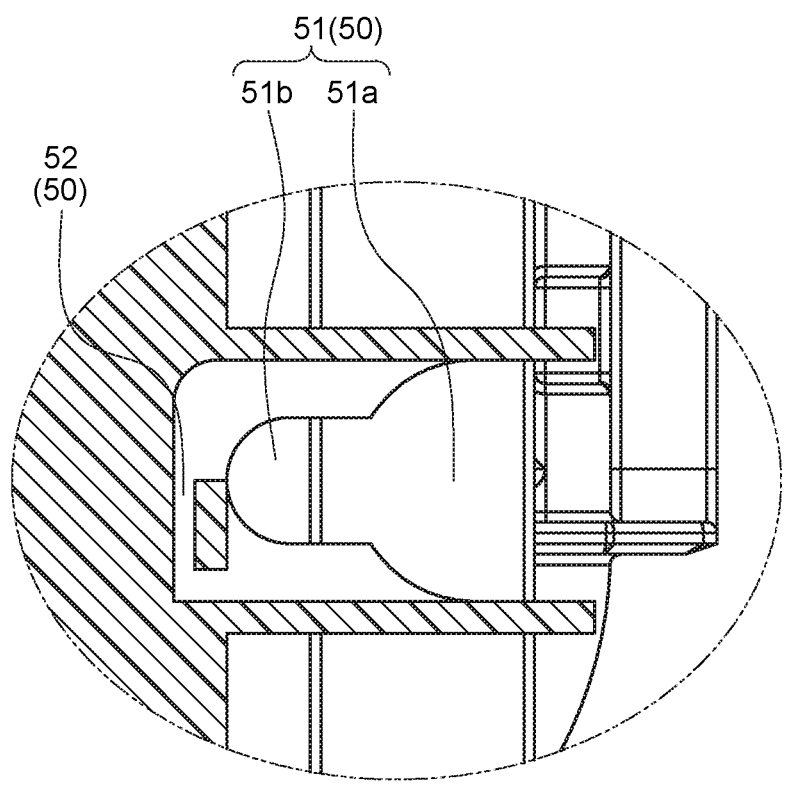
FIG. 15 is a cross-sectional view taken along the line Z1-Z1 in FIG. 14.

The holding mechanism 50 is provided on the lower cover 10B. This holding mechanism 50 includes a U-shaped body 51 formed in a U-shape, being provided with a first holding portion 51*a* for the large diameter wire We1 and a second holding portion 51*b* for the small diameter wire We2. The first holding portion 51*a* is disposed in an opening on the inner side of the U-shaped body 51, and the second holding portion 51*b* is disposed deeper than the opening disposed on the inner side (FIG. 15). In this U-shaped body 51, the second holding portion 51*b* is formed so as not to allow the large diameter wire We1 to enter the second holding portion 51*b*, thereby regulating holding positions of the large diameter wire We1 and the small diameter wire We2.

Furthermore, on the radially outer side of the large diameter wire We1 and the small diameter wire We2 inserted into the U-shaped body 51, the holding mechanism 50 is provided with an insertion portion 52 configured to allow a band body 43*a* of the binding band 43 before binding to insert thereinto (FIG. 15). The large diameter wire We1 and the small diameter wire We2 are respectively inserted into the first holding portion 51*a* and the second holding portion 51*b*, and the binding band 43 is tightened with the band body 43*a* being inserted into the insertion portion 52. Accordingly, the large diameter wire We1 and the small diameter wire We2 are held by the U-shaped body 51.

Figure 16:
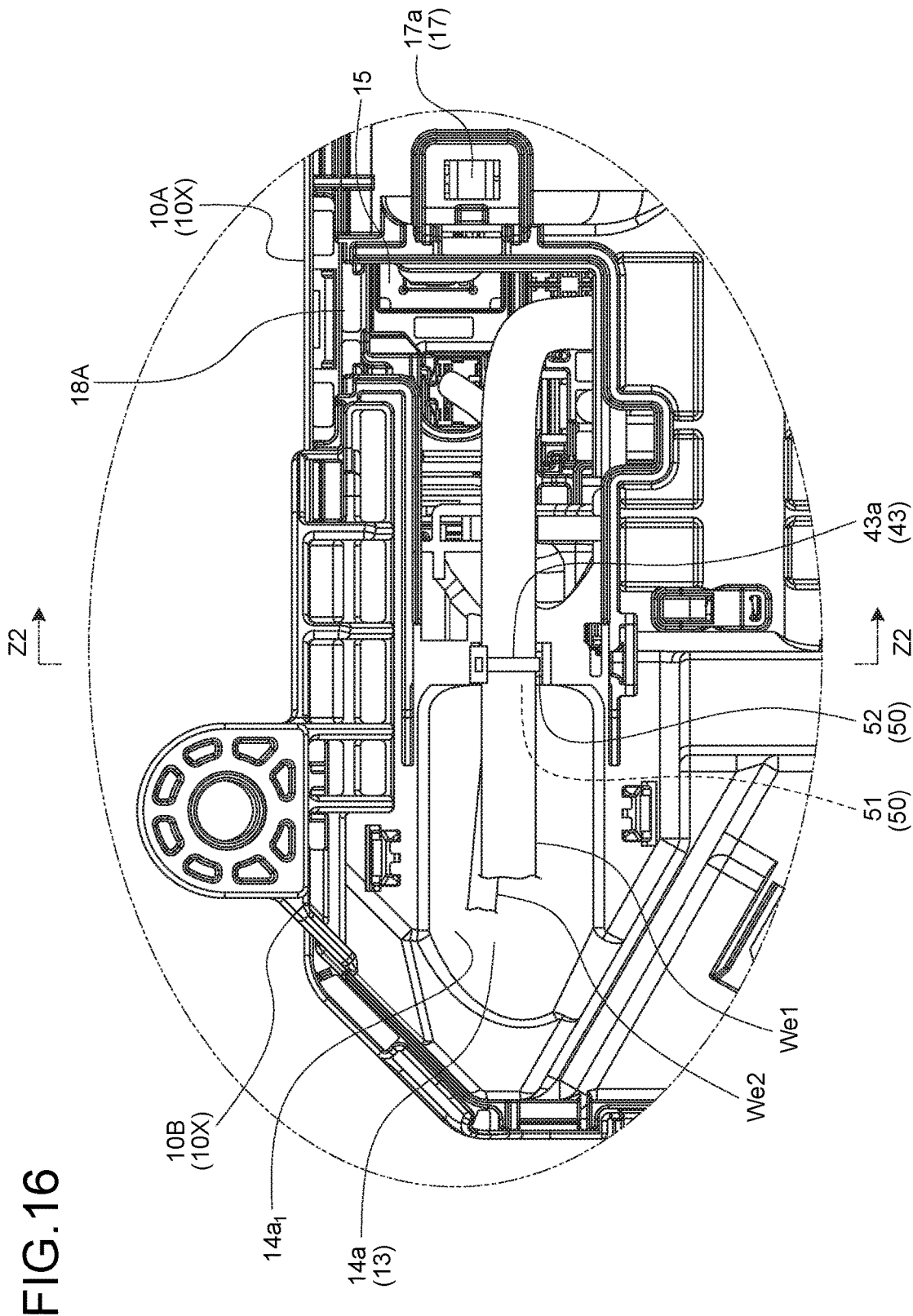
FIG. 16 is a plan view illustrating the wire routing channel of another embodiment together with wires.
Figure 17:
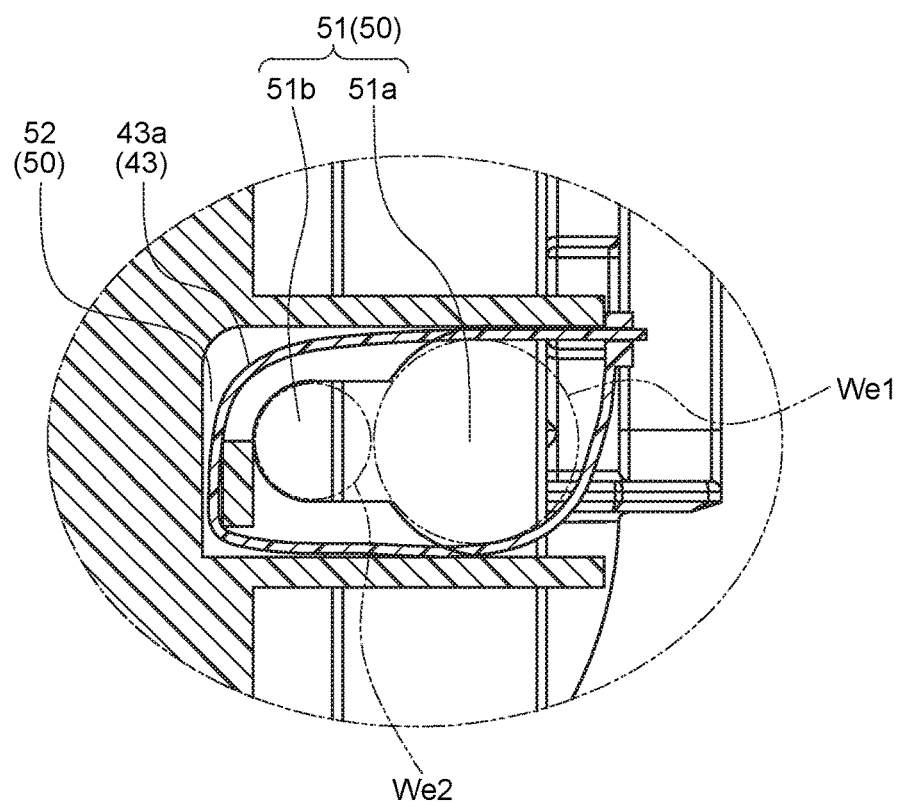
FIG. 17 is a cross-sectional view taken along the line Z2-Z2 in FIG. 16.
Figure 18:
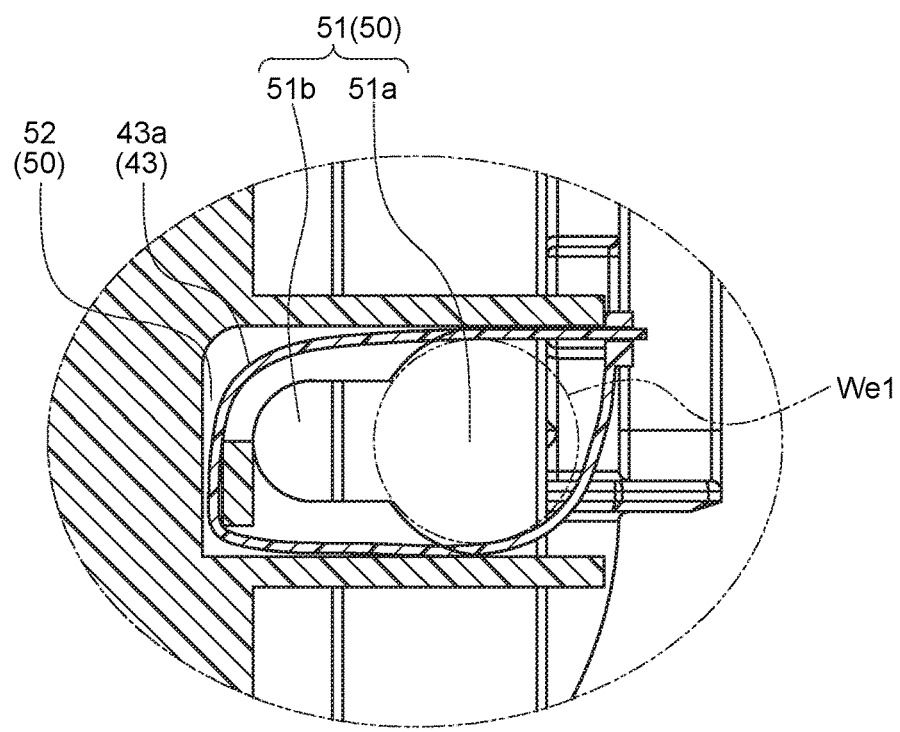
FIG. 18 is a view for explaining a wire routing pattern of another embodiment in the wire routing channel illustrated in FIG. 14.
Figure 19:
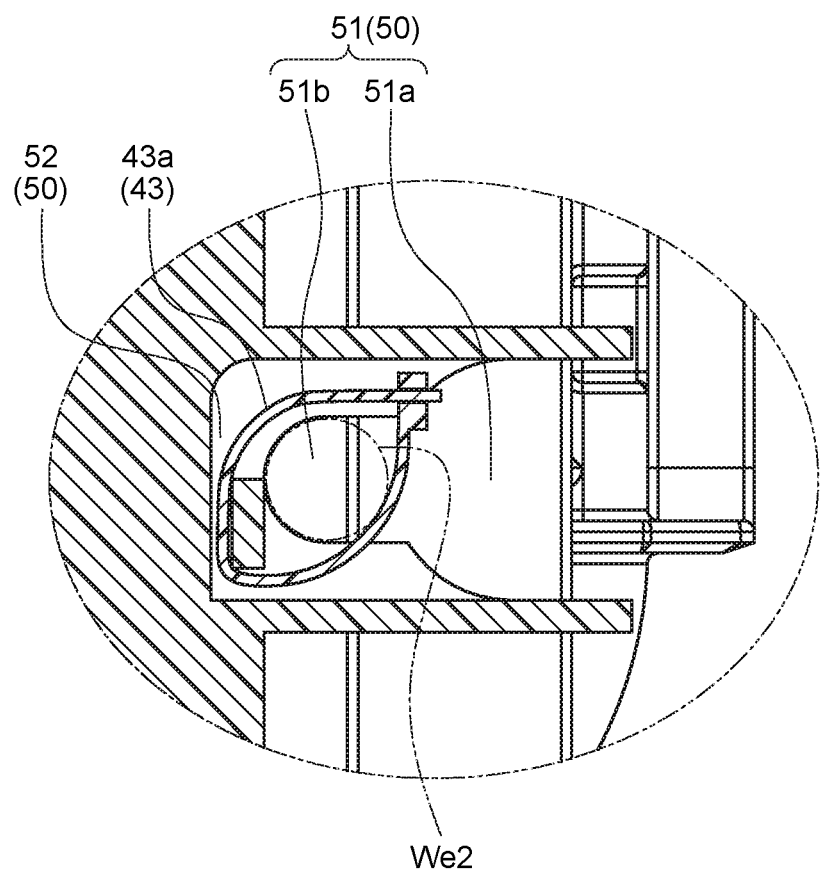
FIG. 19 is a view for explaining a wire routing pattern of still another embodiment in the wire routing channel illustrated in FIG. 14.

This holding mechanism 50 can hold both of the large diameter wire We1 and the small diameter wire We2 by gathering together with one binding band 43 (FIGS. 16 and 17). Since this electrical connection box 1 is provided with the holding mechanism 50, it is possible to improve workability of band tightening in the wire routing space 13. Furthermore, the holding mechanism 50 can hold the large diameter wire We1 with the binding band 43 (FIG. 18). Still further, the holding mechanism 50 can hold the small diameter wire We2 with the binding band 43 (FIG. 19). This electrical connection box 1 can be configured as one having various specifications with the electronic component 20 to be accommodated being changed in type and number so that the wires We are changed in type and number depending on the type and the number of the electronic component 20. For example, in this electrical connection box 1, other than the aforementioned embodiment, the large diameter wire We1 may be routed in the wire routing space 13. Alternatively, the small diameter wire We2 may be routed in the wire routing space 13. Since the electrical connection box 1 is provided with the holding mechanism 50, either case is employable without changing its configuration.

Modification

Figure 20:
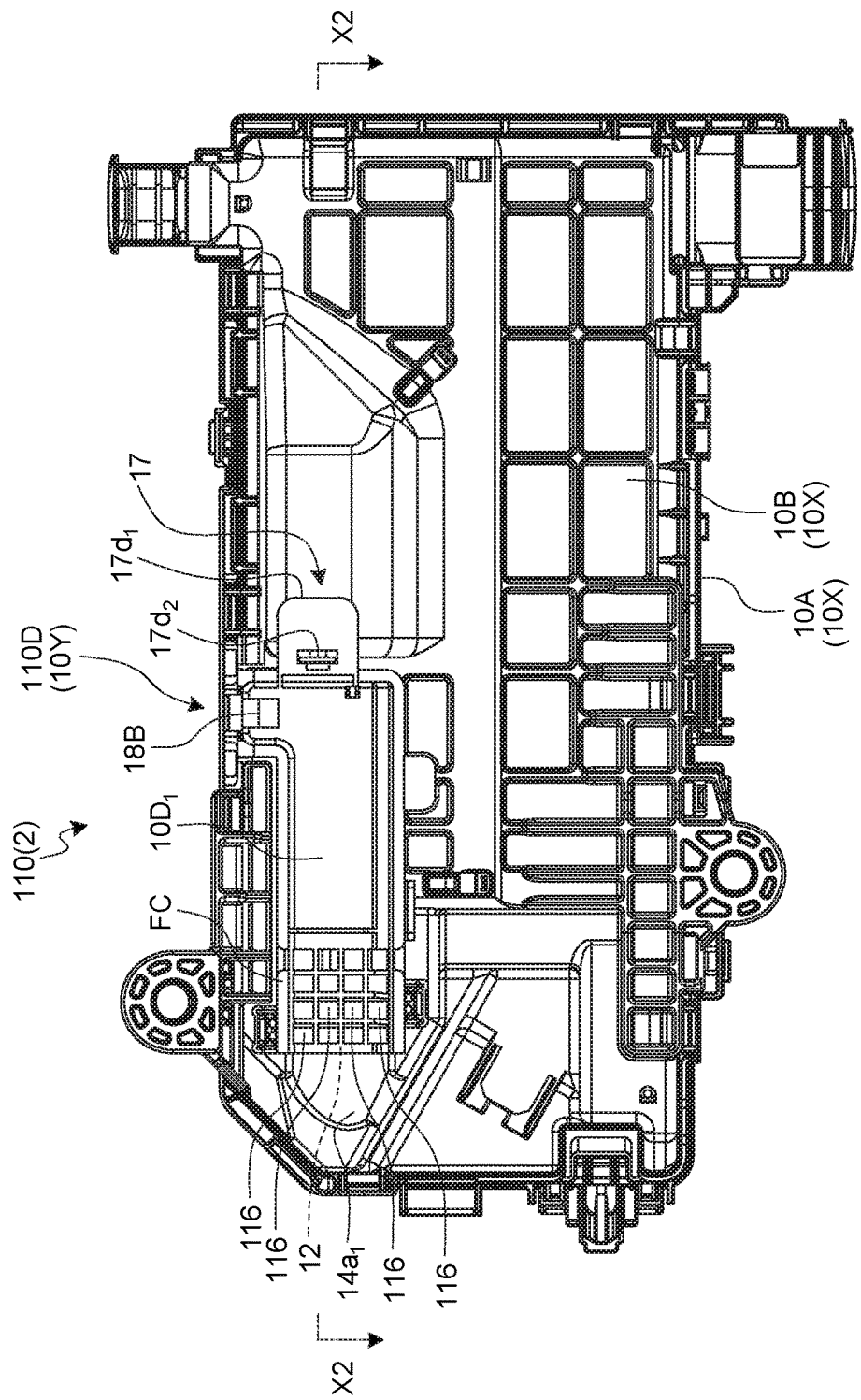
FIG. 20 is a plan view of an electrical connection box according to a modification.

The reference numeral 2 in FIG. 20 denotes an electrical connection box of this modification. The electrical connection box 2 of this modification corresponds to the electrical connection box 1 of the aforementioned embodiment with the housing 10 being replaced by the following housing 110. The housing 110 of this modification corresponds to the housing 10 with the sub-cover 10D serving as the sub-housing 10Y being replaced by the following sub-cover 110D. In this modification, structures (components, parts, and the like) similar to those in the electrical connection box 1 of the embodiment are denoted with the same reference numerals.

The sub-cover 110D of this modification corresponds to the sub-cover 10D of the embodiment with the drain hole 16 being replaced by the following drain hole 116. The drain hole 116 of this modification is configured to discharge liquid entering a wire routing space 13 through a wire outlet 12 in a manner similar to the drain hole 16 of the embodiment. With such a drainage function, the drain hole 116 of this modification prevents entry of the liquid from the outside of the housing 110 through the drain hole 116 itself.

Figure 21:
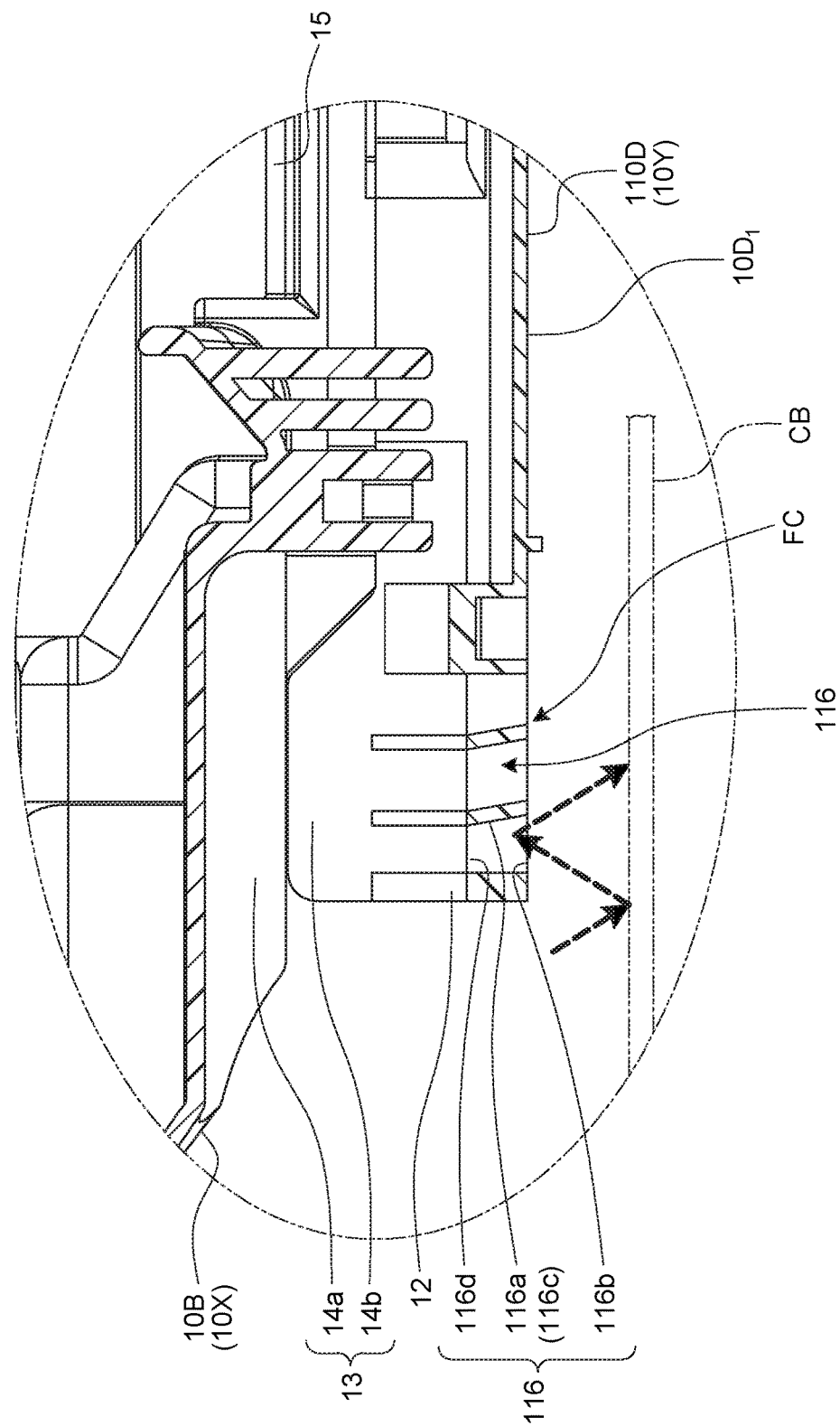
FIG. 21 is a cross-sectional view taken along the line X2-X2 in FIG. 20, and is an enlarged view of the periphery of a sub-cover.

In order to obtain a function to prevent liquid entry, an inner wall surface 116*a* forming the drain hole 116 is provided with a contact wall surface 116*c* that comes into contact with the liquid entering the drain hole 116 through an opening 116*b* in the drain hole 116 disposed in a side close to the outside of the housing 110 (FIG. 21). The contact wall surface 116*c* is formed into an inclined plane so that the normal line at a contact point of the liquid faces the opening 116*b*. Herein, the inner wall surface 116*a* is inclined as a whole so as to use this inner wall surface 116*a* as the contact wall surface 116*c*. For example, liquid outside the housing 110 bounces off a car body CB and enters inside the housing 110 through the opening 116*b* of the drain hole 116 (the arrow illustrated in FIG. 21). According to this drain hole 116, the liquid entering through the opening 116*b* touches the inner wall surface 116*a* (the contact wall surface 116*c*) before reaching the opening 116*d* on the side close to the wire routing space 13, which prevents the liquid from entering into the wire routing space 13 through the opening 116*d*. Furthermore, the drain hole 116 is capable of discharging liquid, which comes into contact with the inner wall surface 116*a* (the contact wall surface 116*c*), to the outside of the housing 110 through the opening 116*b*.

In the electrical connection box 2 of this modification, the liquid entering the wire routing space 13 through the wire outlet 12 can be discharge outside the housing 110 through the drain hole 116, and the liquid entering the drain hole 116 through the opening 116*b* can be prevented from entering the wire routing space 13. In other words, the electrical connection box 2 of this modification not only provides an effect similar to that of the electrical connection box 1 of the embodiment, but also prevents entry of liquid through the drain hole 116. Therefore, the electrical connection box 2 of this modification has further excellence in water resistance and has an enhanced effect of preventing the liquid outside the housing 110 from flowing into the accommodation chamber 11. Thus, in this electrical connection box 2, the liquid is far less likely to contact the electronic component 20 of the accommodation chamber 11, which leads to a further improvement in durability of the electronic component 20 or of the wires We connected to the electronic component 20. Furthermore, a wire harness WH of this modification includes the electrical connection box 2 so that it is possible to exert an effect of the electrical connection box 2.

It should be noted that both of the drain holes 16 and 116 may be included in the electrical connection box 2 of this modification. For example, a side close to the wire outlet 12 which is relatively more likely, when compared, to allow liquid to enter therethrough may be formed with the drain hole 116 according to this modification, and a side deeper than the wire outlet 12 (that is, a side close to the wire insertion hole 15) may be formed with the drain hole 16 according to the embodiment.

In an electrical connection box according to an embodiment of the present invention, liquid entering a wire routing space through a wire outlet can be discharged outside a housing through a drain hole. Accordingly, this electrical connection box has excellent water resistance and is capable of preventing liquid outside the housing from flowing into a accommodation chamber. Therefore, in this electrical connection box, the liquid is less likely to contact an electronic component of the accommodation chamber, which leads to an improvement in durability of the electronic component or of wires connected to the electronic component. Furthermore, a wire harness according to an embodiment of the present invention includes the electrical connection box so that it is possible to exert an effect of the electrical connection box.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
   a housing; and
   at least one electronic component accommodated in the housing, wherein
   the housing includes
      an accommodation chamber in which the electronic component is accommodated,
      a wire outlet configured to draw out a wire electrically connected to the electronic component to an outside of the housing, and
      a wire routing space configured to guide the wire drawn out from the accommodation chamber to the wire outlet,
   the housing includes a wall having an inner wall surface that defines the wire routing space and configured to form an outer wall of the housing, and the wall includes a drain hole which is a through hole configured to communicate the wire routing space and the outside of the housing and configured to discharge liquid that enters through the wire outlet toward the inner wall surface to the outside of the housing, and
   the drain hole is formed in a first contact area of the inner wall surface toward which the liquid that enters the wire routing space through the wire outlet heads first.

2. The electrical connection box according to claim 1, wherein
   the first contact area is formed with a plurality of drain holes.

3. The electrical connection box according to claim 2, wherein
   the wire outlet and the wire routing space are formed by a first wire routing unit and a second wire routing unit respectively included in a main housing and a sub-housing that are attached to each other,
   the main housing includes the accommodation chamber disposed inside the main housing, the first wire routing unit disposed in an outer wall surface of the main housing, and a wire insertion hole configured to lead the wire drawn out from the accommodation chamber to the first wire routing unit, and
   the sub-housing includes the second wire routing unit configured to cover the first wire routing unit and the wire insertion hole, and the wall formed with the drain hole.

4. The electrical connection box according to claim 2 wherein
   the wire outlet and the wire routing space are formed by a first wire routing unit and a second wire routing unit, respectively included in a main housing and a sub-housing that are attached to each other,
   the main housing includes a work opening which is an opening connected to the wire insertion hole and configured to communicate the inside and the outside of the main housing and which is configured to guide the wire drawn out from the accommodation chamber when inserting the wire into the wire insertion hole, and
   the sub-housing includes a closing wall configured to close the work opening, and
   a locking mechanism is provided between the main housing and the sub-housing, and is configured to make the closing wall hold to the main housing engageably, the locking mechanism includes a first engagement body provided on the main housing and a second engagement body provided on the closing wall, being engageably held by the first engagement body when assembling the main housing and the sub-housing.

5. The electrical connection box according to claim 2, wherein
   the inner wall surface having the drain hole includes a contact wall surface that comes into contact with liquid entering the drain hole through an opening in the drain hole disposed in a side close to the outside of the housing, and
   the contact wall surface is formed into an inclined plane so that a normal line at a contact point of the liquid faces the opening.

6. The electrical connection box according to claim 5 wherein
   the main housing includes a work opening which is an opening connected to the wire insertion hole and configured to communicate the inside and the outside of the main housing and which is configured to guide the wire drawn out from the accommodation chamber when inserting the wire into the wire insertion hole, and
   the sub-housing includes a closing wall configured to close the work opening, and
   a locking mechanism is provided between the main housing and the sub-housing, and is configured to make the closing wall hold to the main housing engageably,
   the locking mechanism includes a first engagement body provided on the main housing and a second engagement body provided on the closing wall, being engageably held by the first engagement body when assembling the main housing and the sub-housing.

7. The electrical connection box according to claim 6, wherein the wire outlet and the wire routing space are formed by a first wire routing unit and a second wire routing unit, respectively included in a main housing and a sub-housing that are attached to each other, the inner wall surface having the drain hole includes a contact wall surface that comes into contact with liquid entering the drain hole through an opening in the drain hole disposed in a side close to the outside of the housing, and the contact wall surface is formed into an inclined plane so that a normal line at a contact point of the liquid faces the opening.

8. The electrical connection box according to claim 7, wherein the wire outlet and the wire routing space are formed by a first wire routing unit and a second wire routing unit respectively included in a main housing and a sub-housing that are attached to each other, the main housing includes the accommodation chamber disposed inside the main housing, the first wire routing unit disposed in an outer wall surface of the main housing, and a wire insertion hole configured to lead the wire drawn out from the accommodation chamber to the first wire routing unit, and the sub-housing includes the second wire routing unit configured to cover the first wire routing unit and the wire insertion hole, and the wall formed with the drain hole.

9. The electrical connection box according to claim 1, wherein the wire outlet and the wire routing space are formed by a first wire routing unit and a second wire routing unit, respectively included in a main housing and a sub-housing that are attached to each other, the main housing includes a work opening which is an opening connected to the wire insertion hole and configured to communicate the inside and the outside of the main housing and which is configured to guide the wire drawn out from the accommodation chamber when inserting the wire into the wire insertion hole, and the sub-housing includes a closing wall configured to close the work opening, and a locking mechanism is provided between the main housing and the sub-housing, and is configured to make the closing wall hold to the main housing engageably, the locking mechanism includes a first engagement body provided on the main housing and a second engagement body provided on the closing wall, being engageably held by the first engagement body when assembling the main housing and the sub-housing.

10. The electrical connection box according to claim 1, wherein the wire outlet and the wire routing space are formed by a first wire routing unit and a second wire routing unit, respectively included in a main housing and a sub-housing that are attached to each other, the main housing includes the accommodation chamber disposed inside the main housing, the first wire routing unit disposed in an outer wall surface of the main housing, and a wire insertion hole configured to lead the wire drawn out from the accommodation chamber to the first wire routing unit, and the sub-housing includes the second wire routing unit configured to cover the first wire routing unit and the wire insertion hole, and the wall formed with the drain hole.

11. The electrical connection box according to claim 10, wherein the main housing includes a work opening which is an opening connected to the wire insertion hole and configured to communicate the inside and the outside of the main housing and which is configured to guide the wire drawn out from the accommodation chamber when inserting the wire into the wire insertion hole, and the sub-housing includes a closing wall configured to close the work opening, and a locking mechanism is provided between the main housing and the sub-housing, and is configured to make the closing wall hold to the main housing engageably, the locking mechanism includes a first engagement body provided on the main housing and a second engagement body provided on the closing wall, being engageably held by the first engagement body when assembling the main housing and the sub-housing.

12. A wire harness comprising:

an electrical connection box provided with a housing configured to accommodate at least one electronic component; and a wire that is electrically connected to the electronic component, wherein the housing includes an accommodation chamber in which the electronic component is accommodated, a wire outlet configured to draw out the wire electrically connected to the electronic component from the housing; and a wire routing space configured to guide the wire drawn out from the accommodation chamber to the wire outlet, the housing includes a wall having an inner wall surface that defines the wire routing space and configured to form an outer wall of the housing, and the wall includes a drain hole which is a through hole configured to communicate the wire routing space and the outside of the housing and configured to discharge liquid that enters through the wire outlet toward the inner wall surface to the outside of the housing, and the drain hole is formed in a first contact area of the inner wall surface toward which the liquid that enters the wire routing space through the wire outlet heads first.

* * * * *